(12) United States Patent
Kuroda et al.

(10) Patent No.: US 6,846,135 B2
(45) Date of Patent: Jan. 25, 2005

(54) RADIUS END MILL HAVING RADIUS EDGE ENHANCED IN RESISTANCE TO CHIPPING AND FRACTURE

(75) Inventors: Takahito Kuroda, Ritto (JP); Ryosuke Okanishi, Moriyama (JP); Yasushi Sakamoto, Yasu-gun (JP); Katsutoshi Maeda, Shiga (JP)

(73) Assignee: Hitachi Tool Engineering Ltd., Tokyo (JP)

( * ) Notice: Subject to any disclaimer, the term of this patent is extended or adjusted under 35 U.S.C. 154(b) by 136 days.

(21) Appl. No.: 10/390,968

(22) Filed: Mar. 18, 2003

(65) Prior Publication Data

US 2003/0180104 A1 Sep. 25, 2003

(30) Foreign Application Priority Data

| Mar. 25, 2002 | (JP) | 2002-082541 |
| Mar. 27, 2002 | (JP) | 2002-087931 |
| May 16, 2002 | (JP) | 2002-140851 |
| Aug. 27, 2002 | (JP) | 2002-246971 |
| Aug. 27, 2002 | (JP) | 2002-246972 |

(51) Int. Cl.$^7$ ............................................. B23B 5/10
(52) U.S. Cl. ........................ 407/53; 407/54; 407/34; 407/63
(58) Field of Search .................. 407/34, 53, 54, 407/56, 57, 60, 61, 62, 63

(56) References Cited

U.S. PATENT DOCUMENTS

| 4,712,948 A | * | 12/1987 | Kidani | 407/42 |
| 5,685,671 A | * | 11/1997 | Packer et al. | 407/54 |
| 5,725,333 A | * | 3/1998 | Abe et al. | 407/54 |
| 6,152,657 A | * | 11/2000 | Packer et al. | 407/32 |
| 6,439,811 B1 | * | 8/2002 | Wardell | 407/54 |

FOREIGN PATENT DOCUMENTS

| JP | 07-246508 | 9/1995 |
| JP | 11-216609 | 8/1999 |
| JP | 2000-052127 | 2/2000 |
| JP | 2002-292514 | 10/2002 |

* cited by examiner

Primary Examiner—Willmon Fridie, Jr.
(74) Attorney, Agent, or Firm—Darby & Darby

(57) ABSTRACT

In a radius end mill having a bottom edge formed on the end face thereof, a radius edge designed in a substantially quarter arc shape and formed at a corner portion thereof, and an outer peripheral edge formed spirally on the side surface thereof, the bottom edge and the radius edge being continuously connected to each other at a connecting point A while the radius edge is continuously connected to each other at a connecting point B, when a view taken along a plane that passes through the connecting points A and B and crosses a rake face of the radius edge is represented by an R cross-sectional view, the rake face of the radius edge is designed to have a convex curved line extending from the connecting point A to the connecting point B in the R cross-sectional view.

30 Claims, 13 Drawing Sheets

RADIUS END MILL HAVING RADIUS EDGE ENHANCED IN RESISTANCE TO CHIPPING AND FRACTURE

BACKGROUND OF THE INVENTION

1. Field of the Invention

The present invention relates to an improvement of a radius end mill used for a contour line engraving operation, etc. for metal molds, etc., and particularly to an improvement of a radius end mill used for high-feed cutting.

2. Description of the Related Art

A ball-nose end mill has been generally used to subject metal molds, etc. to a contour line engraving operation. Recently, high-efficiency cutting has been strongly required, and a radius end mill has been more frequently used in place of the ball-nose end mill.

As compared with the ball-nose end mill, the cutting edges of the radius end mill are brought into contact with a workpiece at a shorter length. In addition, it is impossible to achieve a high cutting (milling) speed for the ball-nose end mill because the tip portion of the ball-nose end mill is located on the tool rotation axis of the ball-nose end mill. On the other hand, it is possible to achieve a sufficiently high cutting (milling) speed for the radius end mill, so that the radius end mill has a low cutting force, cuts cleanly and is suitable for high-efficiency cutting.

In addition, with respect to the radius end mill, various improvements have been made in accordance with the intended use thereof. For example, JP-A-7-246508 discloses an improvement to reinforce a corner R edge, and JP-A-11-216609 discloses an improvements to enhance cutting performance (machinability).

Furthermore, a long tool-overhang length working such as a corner working, a deep-cutting working or the like has been known as a working of metal molds, etc. Chattering vibration is liable to occur during cutting (milling) in such working processes, and thus these working processes adopt a method in which a table feed speed of an end mill feed is reduced because this feed-reducing method is easily processed on the basis of NC programs. According to the feed-reducing method, not only the working efficiency is reduced, but also an effect of suppressing chattering vibration is lowered and thus a feed per tooth is proportionally reduced. Therefore, the contact frequency of a cutting edge with a workpiece is increased and wear is promoted.

In addition, there is known a method in which a cutting (milling) speed is reduced with keeping the chattering vibration suppressing effect high. However, only this method reduces the feed proportionally, and at any rate the working efficiency is lowered. Recently, high-feed cutting in which the cutting (milling) speed is reduced, however, the table feed speed is increased, that is, the feed per tooth is extremely increased has been used as high-efficiency cutting means.

However, the radius end mill has had such a problem that when the feed per tooth is extremely increased, the cutting load is concentrated to corner R edges and the mechanical strength of the corner R edges is unendurable to the cutting load, so that the corner R edges are chipped or fractured and come to the ends of their lives. Particularly, when the high-feed cutting is carried out in a cutting working needing a large cutting amount such as a rough working or the like, the cutting force is large and the chipping further easily occurs, so that the cutting condition must be loosened. This means that the present cutting condition has not yet reached the high-efficiency cutting.

SUMMARY OF THE INVENTION

The present invention has been implemented in view of the foregoing situation, and has an object to provide a radius end mill which can suppress chipping and fracture of corner R edges to enable high-feed cutting.

Another object of the present invention is to provide a radius end mill which can enhance both the resistance of corner R (radius) edges to chipping and fracture and the performance of discharging chips generated at the corner R edges to thereby enable higher feed cutting.

Further object of the present invention is to provided a radius end mill which can enhance the mechanical strength of corner R edges to thereby increase the lifetime thereof.

Further object of the present invention is to provide a radius end mill which can enhance both the mechanical strength and the machinability of corner R (radius) edges to thereby enable higher feed cutting.

Further object of the present invention is to provide a radius end mill which can enhance the resistance of outer peripheral edges to chipping and fracture with keeping the machinability of corner R (radius) edges to thereby enable higher feed cutting more efficiently.

In order to attain the above objects, according to the present invention, there is provided a radius end mill having a bottom edge formed on the end face thereof, a radius edge designed in a substantially quarter arc shape and formed at a corner portion thereof, and an outer peripheral edge formed spirally on the side surface thereof, the bottom edge and the radius edge being continuously connected to each other at a connecting point A while the radius edge is continuously connected to each other at a connecting point B, and when the intersecting angle between the axial direction of the radius end mill and the normal-line direction at any position of the radius edge is represented by R, the connecting point A corresponding to the R=0° position of the radius edge while the connecting point B corresponds to the R=90° position of the radius edge, characterized in that a view taken along a plane that passes through the connecting points A and B and crosses a rake face of the radius edge is represented by an R cross-sectional view, the rake face of the radius edge is designed to have a convex curved line extending from the connecting point A to the connecting point B in the R cross-sectional view.

In the radius end mill of the present invention, when a position on the convex curved line which is farthest away from the line segment AB in the R cross-sectional view is represented by MO, MO is located at a position between the connecting point A and the position which is located on the convex curved line and corresponds to the middle point of the line segment AB.

In the radius end mill of the present invention, the curvature of the convex curved line of the rake face of the radius edge in the R cross-sectional view is gradually varied in the direction from the connecting point A to the connecting point B.

In the radius end mill of the present invention, the maximum-curvature position of the convex curved line is located at any position on the convex curved line between the connecting point A and the position which is located on the convex curved line and corresponds to the middle point of the line segment AB.

In the radius end mill of the present invention, the average curvature of the convex curved line between the connecting point A and the position which is located on the convex curved line and corresponds to the middle point of the line segment AB is set to be larger than the average curvature of the convex curved line between the connecting point B and the position which is located on the convex curved line and corresponds to the middle point of the line segment AB.

In the radius end mill of the present invention, a surface constituting a rake face of the radius edge is designed to have a convex curved surface in the direction from the R=90° position to the R=0° position of the radius edge, and a rake face of the bottom edge extending from the R=0° position of the radius edge to the tool rotation axis of the radius end mill is substantially flat.

In the radius end mill of the present invention, the rake angle of the rake face of the radius edge is set to a negative angle over the area between the R=90° position and the R=0° position of the radius edge in both the normal-line direction of the radius edge and the radial direction of the radius end mill.

In the radius end mill of the present invention, the rake angle in the tool rotation axis direction of a rake face of the bottom edge is set to be smaller than the rake angle of the rake face at the R=0° position of the radius edge.

In the radius end mill of the present invention, the rake face of the bottom edge is a gash-worked face.

In the radius end mill of the present invention, the edge angle of the radius edge is gradually varied from an acute angle to an obtuse angle and then varied from an obtuse angle to an acute angle in the direction from the bottom edge side to the outer peripheral edge side of the radius end mill, and the edge angle in at least a radius edge site from the R=30° position to the R=60° position of the radius edge is to an obtuse angle.

In the radius end mill of the present invention, a shift area from the acute angle to the obtuse angle of the edge angle of the radius edge is set between the R=5° position and the R=30° position of the radius edge, and a shift area from the obtuse angle to the acute angle of the edge angle of the radius edge is set between the R=60° position and the R=85° position of the radius edge.

In the radius end mill of the present invention, the maximum value of the obtuse angle is set to 95° or more, and the maximum obtuse angle position of the radius edge is located between the R=30° position and the R=50° position of the radius edge.

In the radius end mill of the present invention, the line segment AB passing through the R=0° position and the R=90° position of the radius edge is inclined with respect to a line CL passing the R=0° position of the radius edge and the rotational center of the end of the radius end mill by 10° to 50° in a axial-direction view achieved when the end portion of the radius end mill is viewed along the axial direction of the radius end mill, and the maximum value of an overhang amount of the edge ridge line of the radius edge which outwardly overhangs from the line segment AB in a convex shape in the sectional view perpendicular to the axial direction of the radius end mill is set to 15% to 30% of the corner R radius.

In the radius end mill of the present invention, the position on the edge ridge line at which the overhang amount of the edge ridge line in the convex shape is maximum is located between the R=30° position and the R=50° position of the radius edge.

In the radius end mill of the presents invention, the radius edge is curved in a convex shape in a corner R45°-direction view of the radius end mill that corresponds to a perspective view of the radius end mill achieved when the radius end mill is viewed along a direction intersecting to the axial direction of the radius end mill at 45° with the connecting point A (R=0° position) of the radius edge set as an anchoring point, and when in the corner R45°-direction view, C represents a projection position on the line segment AB passing through the R=0° position A and the R=90° position B of the radius edge achieved by projecting onto the line segment AB the position corresponding to the maximum overhang amount of the convex-shaped radius edge with respect to the line segment AB, D represents a projection position on the line segment AB achieved by projecting onto the line segment AB a position which corresponds to ¾ of the maximum overhang amount of the convex-shaped radius edge and is nearer to the connecting point A, E represents a projection position on the line segment AB achieved by projecting onto the line segment AB a position which corresponds to ½ of the maximum overhang amount of the convex-shaped radius edge and is nearer to the connecting point A, and F represents a projection position onto the line segment AB achieved by projecting onto the line segment AB a position which corresponds to ¼ of the maximum overhang amount of the convex-shaped radius edge and is nearer to the connecting point A, the length of the line segment CD, DE, EF, FA is varied to be gradually reduced in this order, the variation amount of the length of the line segments is gradually reduced, and the length of the line segment CD is set to 50% or more of the length of the line segment AC.

In the radius end mill of the present invention, the length of the line segment AC is set to any value in the range from not less than 40% to less than 50% of the length of the line segment AB.

In the radius end mill of the present invention, in the corner R45°-direction view of the radius end mill, the maximum value of the overhang amount of the convex shape of the radius edge is set to a value in the range from 15% to 25% of the corner R radius.

In the radius end mill of the present invention, when G represents a projection position on the line segment AB achieved by projecting onto the line segment AB a position which corresponds to ¾ of the maximum overhang amount of the convex-shaped radius edge and is nearer to the connecting point B, H represents a projection position on the line segment AB achieved by projecting onto the line segment AB a position which corresponds to ½ of the maximum overhang amount of the convex-shaped radius edge and is nearer to the connecting point B, and I represents a projection position onto the line segment AB achieved by projecting onto the line segment AB a position which corresponds to ¼ of the maximum overhang amount of the convex-shaped radius edge and is nearer to the connecting point B, the line segments CG, GH, HI, IB on the line segment AB is gradually reduced in length in this order, and the variation amount thereof is also gradually reduced.

In the radius end mill of the present invention, the relief angle in the normal-line direction of the radius edge is gradually reduced in the direction from the R=0° position to the R=90° position of the radius edge, and the relief angle in the normal-line direction at the R=0° position of the radius edge is set to 10° or more.

In the radius end mill of the present invention, the rake angle in the normal direction at the R=90° position of the radius edge is set to substantially the same rake angle in the normal direction of the outer peripheral edge.

In the radius end mill of the present invention, the rake face of the radius edge is designed in a linear or concave curved shape in a cross-sectional view of the radius edge achieved when viewed along the normal-line direction of the radius edge.

In the Radius end mill of the present invention, the rake face of the radius edge is designed to have a convex curved surface in the direction from the R=0° position to the R=90° position of the radius edge.

In the radius end mill of the present invention, the rake angle of the radius edge is set to a negative angle in both the normal-direction of the radius edge and the radial direction of the radius end mill.

In the radius end mill of the present invention, plural radius edges are equipped to the corner portions of the end portion of the radius end mill, each of the radius edges is provided with a margin portion, and the average width of the margin portion is varied every radius edge and/or is varied in each radius edge.

In the radius end mill of the present invention, the average width of the margin portion provided to each of the radius edges is set to 0.15 mm or less.

In the radius end mill of the present invention, lubricative coating is provided to the margin portion.

In the radius end mill of the present invention, the radius edge is twisted and continuously connected to the outer peripheral edge spirally-formed on the outer periphery of the radius end mill, the helix angle of the outer peripheral edge is set to 35° to 55°, and a margin having a margin width of 0.02 to 0.2 mm is provided on the radius edge and/or the outer peripheral edge.

In the radius end mill of the present invention, the radius edge is a sharp edge.

In the radius end mill of the present invention, when a first cutting edge represents a cutting site of the radius edge that is located at the bottom edge side and a second cutting edge represents a cutting site of the radius edge that is located at the outer peripheral edge side, the rake faces of the first and second cutting edges are curved in a convex shape in a cross-sectional view perpendicular to the end mill axial direction, wherein the second cutting edge has a recessed chip space that extends in the edge bottom direction of the radius cutting edge continuously with the rake face of the second cutting edge.

In the radius end mill of the present invention, the width of the recessed chip space is gradually reduced.

According to the present invention, the resistance to the fracture of the R edge can be enhanced, and also the discharging performance of chips generated by the R edge can be enhanced, thereby enabling the high-feed cutting.

Furthermore, according to the present invention, the radius end mill of the present invention is applicable to the three-dimensional curved surface working, the contour line operation, etc., and even when it is used in a working having a cutting mount such as a rough working, the chipping and fracture of the R edge can be suppressed, and the high-efficiency cutting in which the feed per tooth is high can be performed. In addition, in the three-dimensional curved surface working, the contour line operation, etc., the mechanical strength and machinability of the R edge can be enhanced, and the high-feed cutting can be performed with high precision.

Still furthermore, according to the present invention, the resistance of the outer peripheral edge to chipping and fracture can be enhanced with keeping high machinability of the R edge, and the high-feed cutting can be performed more stably.

DETAILED DESCRIPTION OF THE PREFERRED EMBODIMENTS

Preferred embodiments according to the present invention will be described hereunder with reference to the accompanying drawings.

Figure 1:
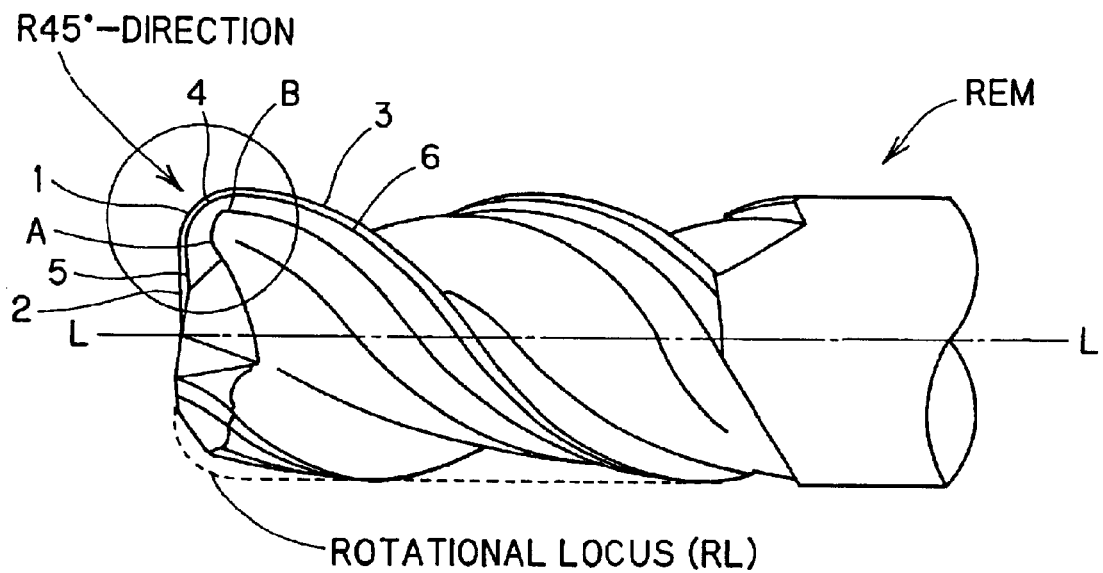
FIG. 1 is a side view showing a radius end mill to which the present invention is applied.
Figure 2:
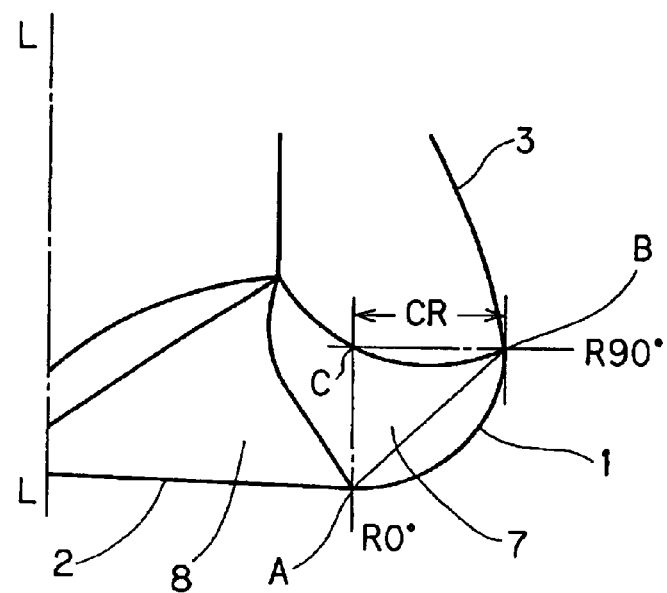
FIG. 2 is an enlarged view showing a rake face side at the corner portion of the radius end mill when the radius end mill of FIG. 1 is viewed in a direction perpendicular to the tool rotation axis (1—1) shown in FIG. 1.

FIG. 1 is a side view showing a radius end mill to which the present invention is applied, and FIG. 2 is an enlarged view showing a corner portion of the radius end mill shown in FIG. 1.

Before individually describing each of embodiments of the present invention, the constituent parts of the radius end mill according to the present invention will be first described.

As shown in FIGS. 1 and 2, the radius end mill REM shown in FIG. 1 is equipped with various cutting edges at the tip portion thereof and at the side surface thereof. The cutting edges of the radius end mill REM include bottom (end) cutting edges (hereinafter referred to as "bottom edges") 2 formed on the bottom (end) face of the radius end mill REM, radius cutting edges (hereinafter referred to as "corner R edges" or merely "R edges") 1 formed at the corner portions of the radius end mill REM and spiral outer peripheral cutting edges 3 (hereinafter referred to as "outer peripheral edges") formed spirally on the side surface of the radius end mill REM. Each bottom edge 2, each radius edge 1 and each outer peripheral edge 3 are continuously connected to one another to constitute a cutting edge set extending from the front side to the rear side of the radius end mill REM as shown in FIGS. 1 and 2, and several (two or more) cutting edge sets (combinations) are equipped to the radius end mill REM.

In FIG. 1, a chain line (1—1) represents the tool rotation axis of the radius end mill REM which corresponds to the rotational center of the radius end mill REM, and a dotted line represents a rotational locus (RL) of the radius end mill REM when the radius end mill REM is rotated. Reference numeral 4 represents the flank of the radius edge 1, reference numeral 5 represents the flank of the bottom edge 2, and reference numeral 6 represents the flank of the outer peripheral edge 3. In FIG. 2, reference numeral 7 represents the rake face of the radius edge 1 and reference numeral 8 represents an end gash face (the rake face of the bottom edge 2). Reference character A represents the connecting point between the radius edge 1 and the bottom edge 2 and reference character B represents the connecting point between the radius edge 1 and the outer peripheral edge 3. The connecting point A corresponds to R0° and the connecting point B corresponds to R90°.

Here, R0° indicates one end position of the R edge 1 located on a line which is parallel to the tool rotation axis (1—1) of the radius end mill REM and passes through the R-center (the center of curvature) C of the R edge 1, and R90° indicates the other end position (connecting point B) of the R edge 1 located on a line which is perpendicular to the tool rotation axis (1—1) of the radius end mill REM and passes through the R-center C of the R edge 1. That is, the R0° site of REM corresponds to one end portion of the R edge 1 in the neighborhood of the connecting point A between the R edge 1 and the bottom edge 2, and R90° site of REM corresponds to the other end portion of the R edge 1 in the neighborhood of the connecting point B between the R edge 1 and the outer peripheral edge 3. Furthermore, the R45° site of REM indicates a portion containing the position of the R edge 1 located on a line which intersects to the tool rotation axis (1—1) of the radius end mill REM at 45° and passes through the R-center C of the R edge 1. That is, the R45° point of R edge 1 corresponds to the intermediate position between the connection positions A and B.

Next, preferred embodiments of a radius end mill according to the present invention will be described hereunder with reference to the accompanying drawings. In the following embodiments, a radius end mill having a substantially quarter arc type corner R edge at each corner portion of the tip portion thereof is representatively used, however, the present invention is not limited to this type of radius end mill, and it may be applied to other generally known radius end mills.

[First Embodiment]

Now, a first embodiment according to the present invention will be described with reference to FIG. 3.

Figure 3:
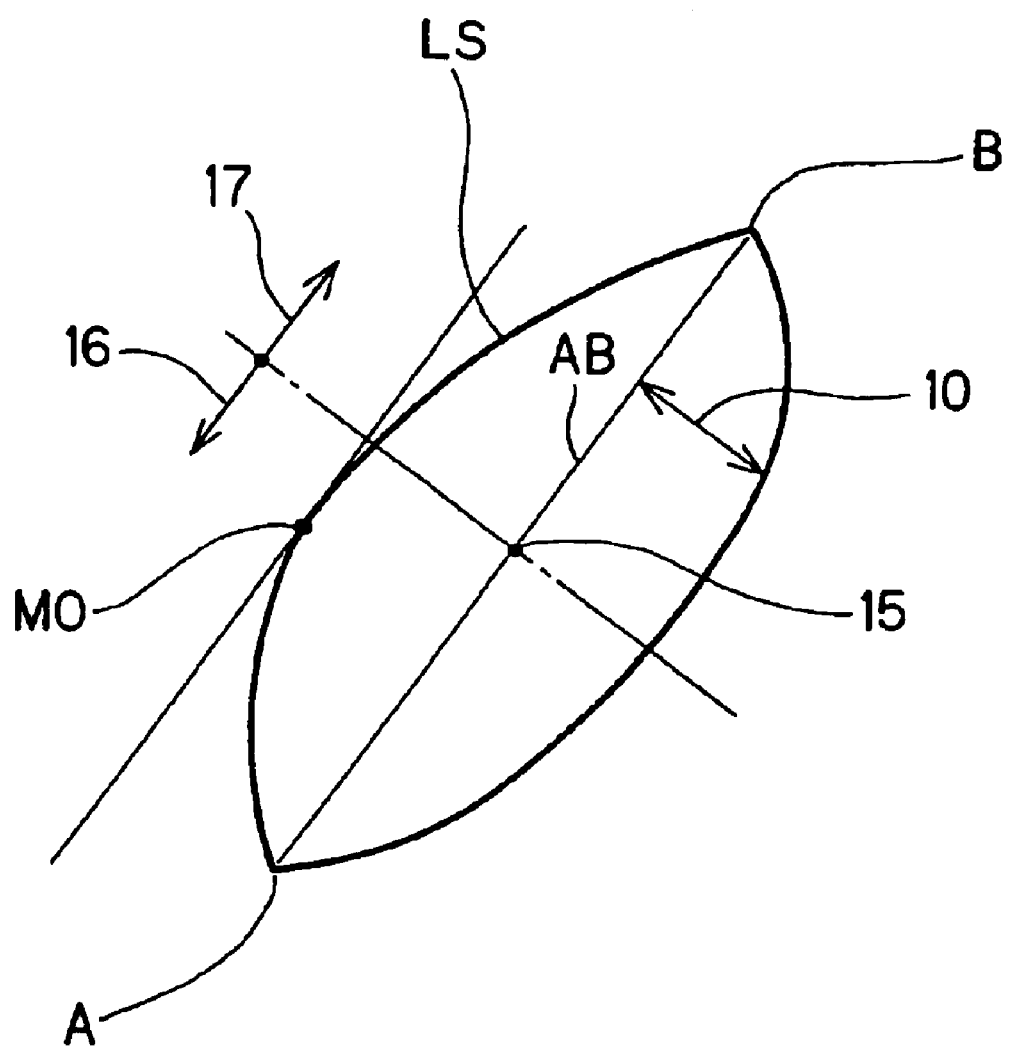
FIG. 3 is an enlarged cross-sectional view of a corner portion of the radius end mill according to a first embodiment of the present invention.

FIG. 3 is an enlarged cross-sectional view of a corner portion of the radius end mill REM according to the first embodiment, which contains the line AB connecting the connecting points A and B, and corresponds to a plan view which is viewed from the side of the rake face 7 of the radius edge 1.

In this embodiment, the cross-section view of the corner portion of the radius end mill REM in FIG. 3 is achieved by cutting the corner portion of REM along a plane which passes through the two connecting points A and B (i.e., contains the line segment AB connecting the connecting points A and B) so as to intersect to the rake face 7 of the R edge 1. The cross-sectional view thus achieved will be hereinafter referred to as "R cross-sectional view"). According to this embodiment, the surface shape of the rake face 7 of the R edge 1 is designed so that the line shape 7' of the rake face 7 of the R edge 1 in the R cross-sectional view is a convex-shaped curved line extending from the connecting point A to the connecting point B as shown in FIG. 3. Such a special surface shape brings various effects to a high-feed cutting radius end mill and is suitable for the high-feed cutting as follows. That is, the surface shape of the rake face 7 of the R edge 1 is designed so as to have a convex-shaped curved line in a cross-sectional view taken along at least a plane that passes through the connecting points A and B and crosses the rake face 7 of the R edge 1.

In the high-feed cutting in which the feed per tooth is increased, the cutting amount in the axial direction of the tool is set to 35% or less of the corner R radius CR (corresponding to the length between the line which is parallel to the tool central axis and passes through the connecting point A and the line which is parallel to the tool central axis and passes through the connecting point B in FIG. 2). When such high-feed cutting is carried out, chips occur in the neighborhood of the connecting point A due to the phase relationship of the cutting edges, and flow in an upper slant direction, that is, flow from the connecting point A toward the connecting point B. Therefore, in order to bring the R edges 1 of the radius end mill REM with both high mechanical strength and high machinability (cutting or milling performance), that is, in order to enhance the mechanical strength and the machinability of the R edges 1, the surface shape of the rake face of each R edge 1 is designed so as to have a convex curved line extending from the connecting point A to the connecting point B in the cross-sectional view achieved by cutting the corner portion containing the R edge 1 along a plane which passes through the connecting points A and B so as to intersect to (cut) the rake face 7 of the R edge 1.

The inventors of this application has discovered that when the rake face 7 of each R edge 1 is designed to have such a special surface shape, the mechanical strength of the cutting edge of the R edges can be enhanced, chips occurring at the connecting point A can be quickly separated from the rake face 7 of the R edge 1 and the cutting force can be reduced, so that the machinability can be enhanced.

In this embodiment, the surface shape of the rake face 7 of the R edge 1 is specified by using the R cross-sectional view defined as described above because the R cross-sectional view thus defined makes it easy to visually recognize the location of occurrence of chips and the flow direction of the chips thus occurring and makes the cross-sectional shape of the rake face 7 of the R edge 1 observable at a glance.

With respect to the convex curved line of the rake face 7 on the R cross-sectional view (FIG. 3), the inventors of this application has also discovered that as the curvature of the convex curved line 7' increases, the machinability can be further enhanced. Accordingly, it is preferable to gradually vary the curvature of the convex curved line 7' in the direction from the connecting point A to the connecting point B and also locate the maximum-curvature position MO of the convex curved line 7' to any position in the area 16 between the connecting point A and the middle point 15 of the line segment AB, which mainly contributes to the cutting. Furthermore, it is also preferable that the average curvature of the convex curved line 7' in the area 16 between the middle point 15 and the connecting point A, that is, the curvature of an approximately arc portion in the area 16 is set to be larger than the curvature of an approximately arc portion in the area 17 between the middle point 15 and the connecting point B.

The contact distance between the maximum overhang position MO of the convex curved line 7' and chips is shortest, and thus the cutting force is reduced at this place. Accordingly, the most excellent machinability can be achieved at this portion. Therefore, it is effective that the maximum overhang position MO of the convex curved line is located at a position which is equal to 35% or less of the corner R radius CR. That is, when the maximum overhang portion MO of the convex curved line 7' is located in the area 16, the excellent machinability can be achieved, and thus it provides a large effect of reducing chattering vibration.

As described above, the cutting amount in the tool axial direction is set to 35% or less of the corner R radius at a general site in the high-feed cutting in which the feed per tooth is extremely increased. Accordingly, particularly by designing the surface shape of the rake face 7 of the R edge 1 so as to have a convex curved line in the R cross-sectional view at least in the area 16 corresponding to a site which is mainly used in the cutting process, a portion of the R edge 1 which is mainly used in the cutting process can surely achieve high mechanical strength and machinability.

Furthermore, a recess portion or a linear portion may be formed in the neighborhood of the connecting point B of the R edge 1. This site is not mainly used in the cutting process, and it has no effect on the high-feed cutting. Therefore, such a modification is contained in the subject matter of the present invention.

In the case of the high-feed cutting, it has a larger cutting load than the general cutting, and the cutting load is more concentrated to weak-strength portions in the whole R edge body, resulting in fracture of the R edge. Furthermore, when a maximum overhang portion exists on the convex curved line of the rake face in the area 16 (the area at the connecting point A side), the thickness of the rake face with respect to the length of the line segment AB is larger in the area 16 than that in the area 17 (the area at the connecting point B side). Therefore, from the viewpoint of strength balance, the average thickness of the flank 4 of the R edge 1 with respect to the line segment AB may be set to be larger in the area 17 than that in the area 16. This structure makes the strength balance of the whole R edge more excellent, and the resistance to fracture can be enhanced.

In order to achieve high mechanical strength in the R edge, it is preferable to set the rake angle of the R edge to a negative angle in the tool radial direction, and it is more preferable to set the rake angle of the R edge to an angle in the range from $-15°$ to $-40°$ in consideration of the mechanical strength and the machinability. If the rake angle in the tool radial direction is a negative angle and the absolute value of the negative value is smaller than $15°$), the cutting edge strength is insufficient, and chipping is more liable to occur. Furthermore, if the absolute value of the negative angle is larger than $40°$, the cutting edge strength is large, however, the machinability is lowered, so that the cutting force is increased. Therefore, chattering vibration occurs and cutting surface roughness is severer. The rake angle is more preferably ranged from $-20°$ to $-35°$ in order to satisfy both the mechanical strength and the machinability of the R edge at high level.

It is advantageous that the number of cutting edges (cutting edge sets) is increased to perform high-efficiency cutting. In the case of a workpiece having a corner portion, when a multi-edge end mill having four or more cutting edges is applied to the workpiece, simultaneously cutting edges exist at the corner portion, so that chattering vibration is liable to occur due to resonance. Therefore, the number of the cutting edges is preferably set to three. Furthermore, the lifetime of the radius end mill (R edge or the like) can be enhanced by applying hard coating of TiAlN or the like or lubricative coating of Cr type.

Net, preferable examples according to the first embodiment of the present invention will be described hereunder in detail with reference to FIGS. 2 and 3.

EXAMPLE 1

As an example 1 of this embodiment is used a 3-cutting-edge type radius end mill formed of ultrafine particle cemented carbide in which the edge diameter is set to 10 mm, the corner R radius CR is set to 2 mm and the cutting edges are coated with TiAlN. In this example, the surface shape of the rake face 7 of the R edge 1 is designed under the following conditions: the surface shape of the rake front 7 is designed to have a convex curved line extending from the connecting point A to the connecting point B in the R cross-sectional view taken (cut) along a plane which passes through the connecting points A and B so as to cross (intersect to) the rake face 7 of the R edge 1; the maximum-curvature position of the convex curved line is located at a position nearer to the connecting point A than the middle point 15 of the line segment AB (i.e., located in the area 16); the curvature of an approximately arc portion of the convex curved line 7' in the area 16 located between the connecting point A and the middle point 15 is larger than that of an approximately arc portion of the convex curved line 7' in the area 17 between the connecting point B and the middle point 15; the maximum overhang portion MO of the convex curved line is located at a position which was nearer to the connecting point A than the middle point 15 by a distance of about 10% of the line segment AB; and the rake angle of the R edge 1 is set to −25° in the end mill radial direction.

As described above, the rake face 7 in the area 16 is designed in a convex-shape. The convex shape design of the rake face 7 enables the rake face 7 in the area 16 to come into contact with chips for a short time and at a short distance when the chips are generated and discharged along the rake face 7, so that the chips can be smoothly discharged along the rake face 7 of the R edge 1.

The thickness 10 of the flank 4 in the area 17 of the R edge 1 shown in FIG. 3 may be set to be larger than that in the area 16 of the R edge 1 to enhance the mechanical strength of the whole R edge 1.

A cutting test was carried out on the example 1 as follows. Under the condition that prehardened steel of HRC 40 was used as a workpiece, the rotational number of the radius end mill was set to 1680 revolutions per minute, the feed per tooth was set to 0.625 mm per tooth, the table feed speed is set to 4200 mm/min, and the tool overhang amount at an axial direction pitch of 0.6 mm was set to 40 mm, one pocket shape of 100 mm in length, 65 mm in width and 30 mm in depth and having a slope of 3° on the side wall was formed by using the contour line operation using air blow, and the damage state thereof was observed.

As a comparative example, radius end mills described in JP-A-7-246508 and JP-A-11-216609 were formed as comparative examples 2 and 3 in the same dimensions as the example 1 of the present invention, and the same cutting test as described above was carried out.

According to the example 1 of the present invention, chattering vibration was also very small at a pocket corner portion, the cut state was stable, the tool damage state after the working till a depth of 30 mm, that is, after one-shape working was finished indicated normal wear having a slight wear width, and the machined surface was excellent On the other hand, according to the comparative example 2, since the feed per tooth was large, chipping occurred at a third-path working time when the cutting depth in the tool axial direction was set to 1.8 mm, chattering vibration was intensified at the working time of the pocket corner portion, cutting sound was intense and the tool damage state after one-shape working was finished showed that the R edge was fractured. As a result, no original working shape was achieved. Furthermore, according to the comparative example 3, chipping occurred in the R edge at the initial cutting stage, the chattering vibration was intensified and chipping was also intensified at the time when the working was advanced by 30% of the pocket shape, that is, at the cutting depth of 9 mm, so that the lifetime thereof was expired.

EXAMPLE 2

A radius end mill in which the maximum overhang portion MO of the convex curved line was located in the area 17 between the connecting point B and the middle point 15 was manufactured, and the same cutting test was carried out on the radius end mill thus manufactured under the same test condition as the example 1. As a result, till a depth of 30 mm, that is, one shaping process could be performed, and the tool damage state after the working was finished showed the normal wear with no occurrence of chipping. However, as compared with the example 1 of the present invention, chattering vibration occurred to some degree, and a sign of chattering vibration remained on the machined surface.

As described above, according to the above embodiment, the resistance to fracture of the R edge can be enhanced, and also chips generated at the R edge can be excellently discharged, thereby providing a radius end mill that can support high-feed cutting.

[Second Embodiment]

Figure 4:
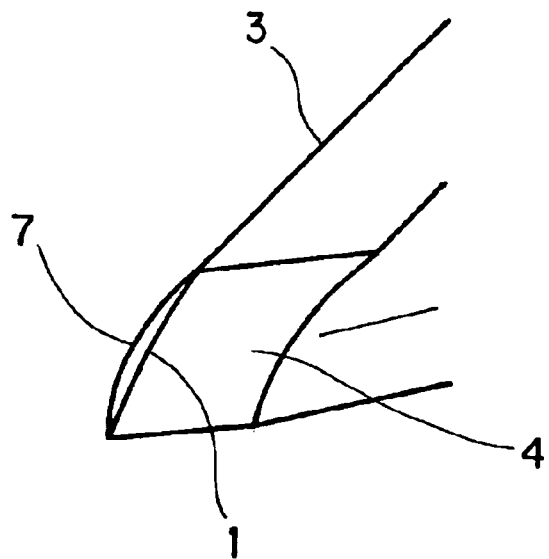
FIG. 4 is an enlarged view showing a flank side at the corner portion of a radius end mill according to a second embodiment of the present invention when the radius end mill is viewed in a direction perpendicular to the tool rotation axis.

The radius end mill according to a second embodiment of the present invention is characterized in that a surface constituting the rake face 7 of the R edge 1 is designed to have a convex curved surface in the direction from the R90° site to the R0° site as shown in FIG. 4, and also the end gash face (the rake face of the bottom edge 2) 8 extending from the R0° site to the tool rotation axis (A—A) is substantially flat.

As described above, the chips generated at the R edge 1 are discharged along the rake face 7. According to this embodiment, in order to reduce the contact direction of the rake face 7 with the chips and lower the cutting force, the face constituting the rake face 7 of the R edge 1 is designed to have a convex curved surface in the direction from the R90° site to the R0° site. With this design of the rake face 7 of the R edge 1, the cutting stress against the rake face 7 can be prevented from concentrating to one direction and thus dispersed in all directions. In addition, there is not any step direction along which the flow of chips is prevented.

Furthermore, the rake face 7 of the bottom (end) edge 2 extending in the direction from the R0° site of the R edge 1 to the tool rotation axis is designed to have a substantially flat plane. Therefore, the chips generated at the R edge 1 can be smoothly discharged without the flow thereof being disturbed on the rake face of the bottom edge 2 and at the boundary of the respective rake faces.

Figure 5:
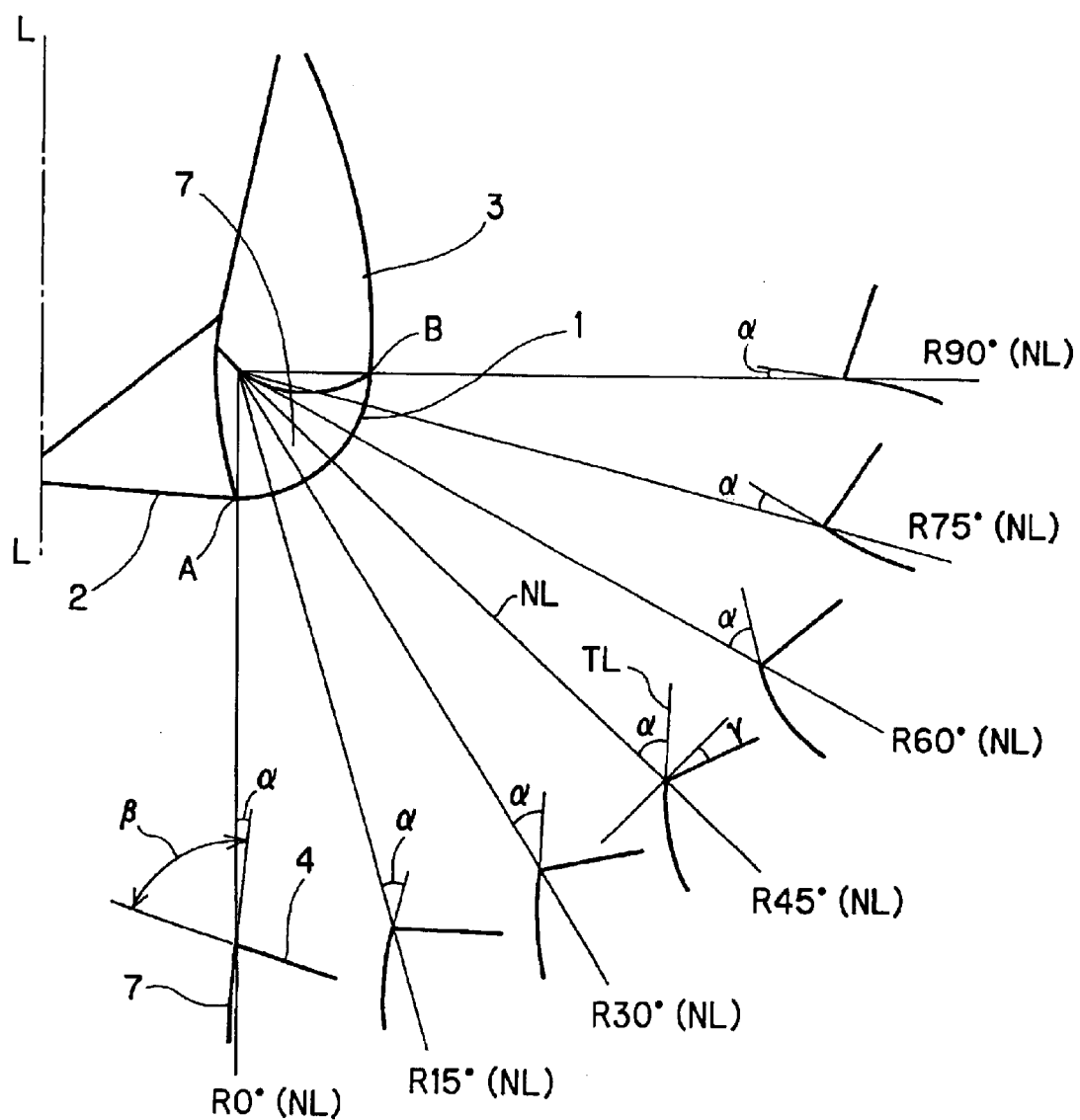
FIG. 5 shows variation of a rake angle $\alpha$ at respective the sites (from R0° to R90°) of an R edge 1.

Still furthermore, the rake angle α of the rake face 7 of the R edge 1 may be set to a negative angle in the area from the R90° site to the R0° site of the R edge 1 both in the R normal-line direction (the direction of the normal line of the R edge 1) represented by NL in FIG. 5 and the tool radial direction. FIG. 5 shows the variation of the rake angle α at respective the sites (from R0° to R90°) of the R edge 1. Here, the rake angle α is defined as the intersecting angle between the normal line NL at any position (R0° to R90°) of the R edge 1 and the tangent line TL of the rake face 7 at the position concerned in FIG. 5. Furthermore, the relief angle γ is defined as the intersecting angle between the line perpendicular to the normal line NL at any position (R0° to R90°) of the R edge 1 and the tangent line of the flank 4 of the R edge 1 at the position concerned in FIG. 5.

When the direction of the tangent line TL of the rake face 7 is located at the right side with respect to the normal line NL in FIG. 5, the rake angle α has a negative value. On the other hand, when the direction of the tangent line TL is located at the left side with respect to the normal line NL in FIG. 5, the rake angle α has a positive angle. Accordingly, FIG. 5 shows that the rake angle α of the rake face 7 of the R edge 1 is set to a negative angle over the whole area from R0° to R90°. In this embodiment, the above condition of the rake angle α is also satisfied in the tool radial direction.

Even in a three-dimensional curved-surface working in which the cutting load is imposed in a broad direction, the radius end mill of this embodiment that satisfies the above condition has high cutting-edge strength.

Furthermore, originally, the bottom edge (end edge) 2 has low machinability, and this adversely affects even the connection portion between the bottom edge 2 and the R edge 1, that is, it adversely affects the R0° site of the R edge 1, so that the R edge may be chipped or broken. Accordingly, in order to enhance the machinability of the bottom edge 2, the rake angle of the bottom edge 2 may be set to be smaller than the rake angle α in the normal line direction at the R0° site of the R edge 1. The rake angle of the bottom edge 2 is preferably set to a positive angle.

In FIG. 5, β represents a included angle of the R edge 1 which is defined as an intersecting angle between the tangent lines of the rake face 7 and the flank 4 of the R edge 1 at any position of the R edge 1.

In order to further enhance the discharging performance of chips, both the gash (rake face) working of the bottom edge 2 and the gash (rake face) working of the R edge 1 may be carried out as a series of working, and the face constituting the rake face 7 of the R edge 1 and the face constituting the rake face 8 of the bottom edge 2 may form one convex curved surface to thereby control the fracture (chipping) of the R edge 1.

Furthermore, in order to perform high-efficiency cutting, it is advantageous to increase the number of cutting edges. In the case of a workpiece having a corner portion, when a multi-edge end mill having four or more cutting edges is applied to the workpiece, simultaneously cutting edges exist at the corner portion, so that chattering vibration is liable to occur due to resonance. Therefore, the number of the cutting edges is preferably set to three. Furthermore, the lifetime of the radius end mill (R edge or the like) can be enhanced by applying hard coating of TiAlN or the like or lubricative coating of Cr type.

Figure 6:
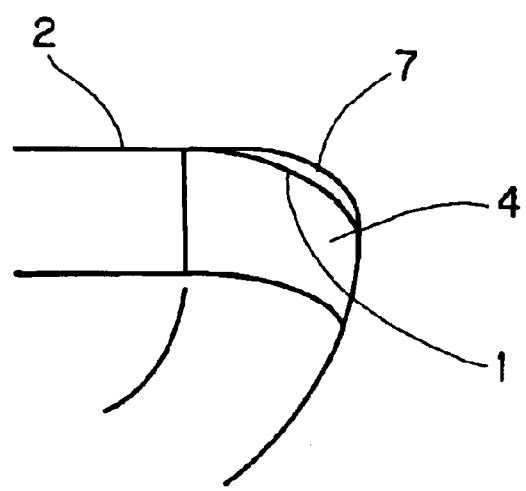
FIG. 6 shows the end portion of the radius end mill of the second embodiment, which is taken from the bottom edge side.

Next, preferable examples according to the second embodiment of the present invention will be described hereunder in detail with reference to FIGS. 2, 4 and 6.

EXAMPLE 1

As an example 1 of this embodiment is used a 3-cutting-edge type radius end mill formed of ultrafine particle cemented carbide in which the tool diameter is set to 12 mm, the corner R radius CR is set to 2 mm and the cutting edges are coated with TiAlN. As shown in FIGS. 2, 4 and 6, when viewing the R edge at the rake face side, the flank side and the bottom edge side, the face constituting the rake face 7 of the R edge 1 is designed to have a convex curved surface in the direction from the R90° site to the R0° site, and the end gash face 7 (the flank of the bottom edge 2) extending in the direction from the R0° site of the R edge 1 to the tool rotation axis (A—A) is designed to have a substantially flat plane.

Prehardened steel of HRC 40 was used a workpiece, and a grooved pocket shape of 150 mm in length, 18 mm in width, 30 mm in depth and 3° in single angle of the side wall was formed by using the contour line operation using air blow under the cutting conditions: a rotational number of 2600 revolutions per minute, a table feed speed of 1250 mm/min, a feed per tooth of 0.16 mm/tooth, a pitch of 0.6 mm in the tool axial direction and a tool overhang length of 65 mm. After the cutting test, the tool damage state was observed.

Furthermore, for comparison, a cutting test as described above was conducted on a conventional radius end mill described above as a comparative example.

As a result of the cutting test of the example 1 of the second embodiment, chattering vibration was very small even in the working in the corner direction of the pocket shape, and the cut state was stable. Furthermore, the tool damage state after the working was carried out till a depth of 30 mm, that is, after one-shape working was finished showed normal wear having a slight wear width and the machined surface was excellent. On the other hand, according to the comparative example, since the feed per tooth was large, chipping occurred at a third-path working time when the cutting depth in the tool axial direction was set to 1.8 mm, chattering vibration was intensified at the working time of the pocket corner portion, cutting sound was intense and the tool damage state after one-shape working was finished showed that the R edge was fractured. As a result, no original working shape was achieved.

EXAMPLE 2

A radius end mill in which the rake angle was set to a negative angle in both the R normal-line direction and the tool radial direction from the R90° site to the R0° site of the R edge 1 was manufactured in the same manner as the example 1, and the same cutting test as the example 1 was conducted on the radius end mill thus manufactured. As a result, in the example 2, the cutting stable was more stable, the tool wear width was further smaller and the machined surface was more excellent as compared with the example 1.

EXAMPLES 3 TO 5

Next, radius end mills in which the rake angle in the normal-line direction at the R0° site of the R edge 1 was commonly set to −5°, however, the rake angle of the bottom (end) edge was set to −5°, 0° and +5° respectively are manufactured as examples 3 to 5 in the same manner as the example 1, and the same cutting test as the example 1 was conducted on the radius end mills of the examples 3 to 5. As a result, in all the tools (radius end mills), chattering vibration was very small, the cut state was stable, the tool damage state showed normal wear having a slight wear width and the machined surface was excellent. Particularly, the cutting sound was reduced more and more in the order from the examples 4, 5 and 6. Furthermore, the wear width at the R0° site of the R edge 1 was small.

Table 1 shows the comparison result between the second embodiment and the comparative example (prior art) when the cutting test was conducted under the condition that a 3-cutting-edge type radius end mill formed of ultrafine particle cemented carbide in which the tool diameter was set to 10 mm, the corner R radius CR was set to 2 mm and the cutting edges were coated with TiAlN was used, prehardened steel of HRC 40 was used as a workpiece, and one pocket shape of 150 mm in length, 18 mm in width, 30 mm in depth and 3° in single angle of the side wall was formed by using the contour line operation using air blow (dry) at a rotational number of 2520 revolutions per minute, a pick in the axial direction of 0.6 mm, a pick in the radial direction of 3 mm, and a tool overhang length of 40 mm.

TABLE 1

| TOOL | F = 1800 mm/min (fz = 0.18 mm/tooth) | F = 3000 mm/min (fz = 0.30 mm/tooth) | F = 3600 mm/min (fz = 0.36 mm/tooth) | F = 4200 mm/min (fz = 0.42 mm/tooth) |
|---|---|---|---|---|
| PRIOR ART | Poor (*1) | | | |
| SECOND EMBODIMENT | Good (*2) | good (*2) | good (*2) | good (*2) |

PRIOR ART: end mill in which the surface shape of the rake face of the R edge was not a convex curved surface.
SECOND EMBODIMENT: end mill in which the surface of the rake face of the R edge was a convex curved surface.
*1: chipping occurred in the corner R portion at the initial cutting stage
*2: excellent cut state and no fracture and no chipping As described above, according to the present invention, there can be provided a radius end mill which can be applied to the three-dimensional curved surface working, the contour line operation, etc., and also can suppress fracture and chipping of the R edges even in a rough working or the like in which the cutting amount is large, so that high-efficiency cutting having a large feed per tooth can be performed.

[Third Embodiment]

When the high-feed cutting is carried out by using a radius end mill, it is generally performed by using the contour line operation because the position associated with the cutting are little varied in the contour line operation. According to a third embodiment of the radius end mill of the present invention, a cutting edge located at the position concerned, that is, the R edge 1 is designed so that a part of the R edge 1 between the R30° position and the R60° position has an obtuse angle (this part will be hereinafter referred to as "obtuse-angle site"). As described above, the R edge 1 is located in the area between the R0° position and the R90° position (see FIG. 5).

By providing the obtuse-angle portion to the R edge 1, a part of the R edge 1 to which the cutting load is concentrated to induce chipping or fracture can be enforced in mechanical strength. Furthermore, when greater importance is given to the mechanical strength, the obtuse-angle site may be provided between the R10° position and the R80° position. On the other hand, when greater importance is given to the cutting performance, the obtuse-angle site may be provided between the R30° position and the R60° position.

Furthermore, when the included angle β of the R edge 1 at each of the connecting position A between the R edge 1 and the bottom edge 2 and the connecting position B between the R edge 1 and the outer peripheral edge 3 (i.e., the included angles β at R0° and R90°) is set to an acute angle (see FIG. 5), the R edge 1 can be smoothly connected to each of the bottom edge 2 and the outer peripheral edge 3. Particularly with respect to the connection between the R edge 1 and the bottom edge 2, the R edge 1 can be more smoothly connected to the bottom edge 2 with the assist of the rake angle of the bottom edge 2.

According to this embodiment, the shift area from the acute-angle portion to the obtuse-angle portion on the R edge 1 may be set in the range from R5° to R30° of the R edge 1. The rake angle α and the included angle β of the bottom edge 2 make dominant actions in the cutting process such as the contour line operation or the like. The rake angle of the bottom edge 2 is preferably set to a positive angle, and thus the rake angle α is likewise varied from a positive angle to a negative angle. In addition, the relief angle γ of the R edge 1 is varied so that the edge shape of the R edge 1 is varied from the linear shape like the bottom edge 2 to a curved line shape. That is, both the rake angle α and the relief angle γ of the R edge 1 are varied.

The rake angle α of the R edge 1 is kept to a positive value or zero at the connecting position A (R0°), and then it is gradually increased to a larger negative angle in the increasing order from R5°, R10°, R15°, R20°, R25° and R30° as shown in FIG. 5. At this time, the relief angle γ of the R edge 1 is set so as to correspond to a curved-line cutting edge, and it is gradually increased. Therefore, the included angle β is gradually increased to achieve an obtuse angle.

Furthermore, according to this embodiment, the shift area from the obtuse-angle portion to the acute-angle portion may be set in the area between the R60° position and the R85° position. With respect to the rake angle α and the included angle β of the outer peripheral edge 3, the amount to be cut out by the outer peripheral edge 3 is gradually increased due to repetitive cutting of the outer peripheral edge 3 in the cutting process such as the contour line operation or the like. Therefore, the rake angle of the outer peripheral edge 3 is preferably set to a positive angle, and thus the rake angle α of the R edge 1 is likewise varied from a negative angle to a positive angle. In addition, the relief angle γ of the R edge 1 is varied so that the edge shape of the R edge 1 is varied from the curved-line shape to a torsional or spiral shape like the outer peripheral edge 3. That is, both the rake angle α and the relief angle γ of the R edge 1 are varied.

The rake angle α of the R edge 1 is kept to a negative angle or zero at the connecting point B between the R edge 1 and the outer peripheral edge 3 (i.e., R90°), and it is gradually shifted to its original rake angle toward the base end side of the outer peripheral edge 3. At this time, the relief angle γ of the R edge 1 and the outer peripheral edge 3 are set to correspond to the torsional (spiral) cutting edge, and the rake angle is gradually shifted to a positive angle while the relief angle γ is gradually increased, whereby the included angle is gradually reduced and shifted from the obtuse angle to the acute angle.

According to this embodiment, the maximum value of the obtuse angle site may be set to 95° or more. The corner R portion of the radius end mil REM is a site which is more liable to be worn or chipped because the cutting speed at the corner R portion is high, a large cutting load is imposed on the corner R portion and the cutting heat during cutting is easily concentrated to the corner R portion. Therefore, the mechanical strength of the cutting edge at the corner R portion must be most enhanced in mechanical strength, and it has been discovered that the setting of 95° or more as the maximum value of the included angle at the obtuse-angle site of the R edge 1 satisfies the above requirements. In addition, it is preferable that the maximum included angle (95° or more) position is located in the area between R30° and R50° because the shift distance of chips at the rake face side of the R edge 1 can be shortened and thus the discharging performance of chips can be enhanced.

Here, in order to further suppress occurrence of any edge portion, the gash working of the bottom edge and the gash working of the R edge may be performed by a series of working so that the edge ridge lines of the R edge and the bottom edge form one convex curved line, whereby the resistance of the R edge to chipping and fracture can be enhanced. Furthermore, in order to perform high-efficiency cutting, it is advantageous to increase the number of cutting edges. In the case of a workpiece having a corner portion, when a multi-edge end mill having four or more cutting edges is applied to the workpiece, simultaneously cutting edges exist at the corner portion, so that chattering vibration is liable to occur due to resonance. Therefore, the number of the cutting edges is preferably set to three. Furthermore, the lifetime of the radius end mill (R edge or the like) can be enhanced by applying hard coating of TiAlN or the like or lubricative coating of Cr type.

Next, preferable examples according to the third embodiment will be described hereunder.

EXAMPLE 1

As an example 1 of this embodiment is used a 3-cutting-edge type radius end mill formed of ultrafine particle cemented carbide in which the edge diameter is set to 12 mm, the corner R radius CR is set to 2 mm and the cutting edges are coated with TiAlN. In this example 1, the rake angle α of the R edge 1 is gradually increased/reduced and the relief angle γ of the R edge 1 is gradually increased from the R0° position to the R90° so that the included angle γ of the R edge 1 is set to 83° at R0°, 90° at R15°, 98° at R30°, 100° at R45°, 98° at R60°, 90° at R75° and 87° at R90°, respectively. For comparison, a radius end mill in which the included angle of the R edge is set to an acute angle over the whole area thereof so that it is set to 83° at R0°, 85° at R45° and 87° at R90° is manufactured in the same manner as the example 1.

Prehardened steel of HRC 40 was used a workpiece, and a grooved pocket shape of 150 mm in length, 18 mm in width, 30 mm in depth and 3° in single angle of the side wall was carried out by the contour line operation using air blow under the cutting conditions: a rotational number of 2600 revolutions per minute, a table feed speed of 1250 mm/min, a feed per tooth of 0.16 mm/tooth and a tool overhang length of 65 mm at a pitch of 0.6 mm in the tool axial direction. After the cutting test, the tool damage state was observed.

As a result of the cutting test of the example 1 of the third embodiment, chattering vibration was very small even in the working of the corner portion of the pocket shape, and the cut state was stable. Furthermore, the tool damage state after the working was carried out till a depth of 30 mm, that is, after one-shape working was carried out, showed normal wear having a slight wear width, and the machined surface was excellent. On the other hand, according to the comparative example, since the feed per tooth was large, chipping occurred at a third-path working time when the cutting depth in the tool axial direction was set to 1.8 mm, chattering vibration was intense at the working time of the pocket corner portion, cutting sound was intense and the tool damage state after one-shape working was finished showed that the R edge was fractured. As a result, no original working shape was achieved.

EXAMPLES 2 TO 5

In the same manner as the example 1, a radius end mill is manufactured as an example 2 by setting the included angles at R0° and R90° to the same angle as the example 1, however, setting the included angle at R45° to 90°, a radius end mill is manufactured as an example 3 by setting the included angles at R0° and R90° to the same angle as the example 1, however, setting the included angle at R45° to 95°, a radius end mill is manufactured as an example 4 by setting the included angles at R0° and R90° to the same angle as the example 1, however, setting the included angle at R45° to 105°, and a radius end mill is manufactured as an example 5 by setting the included angles at R0° and R90° to the same angle as the example 1, however, setting the included angle at R45° to 110°.

The same cutting test and estimation as the example 1 were conducted on the radius end mills of the examples 2 to 5. As a test result, with respect to the examples 2 to 5, the working till a depth of 30 mm, that is, one-shape working could be performed, and the initial working shape was achieved. Particularly, with respect to the examples 1 and 3, chattering vibration was very small, the cut state was stable, the end mill damage state showed normal wear having a slight wear width and the machined surface was excellent. A slightly minute chipping was observed with respect to the example 2. With respect to the example 6, neither chipping nor fracture was observed, however, chattering vibration and cutting sound are somewhat intense.

EXAMPLES 6 TO 10

The radius end mills of examples 6 to 10 and a comparative example 2 are manufactured in the same manner as the example 1 while varying the location of the shift position from the acute angle to the obtuse angle on the R edge 1 so that the shift location is set to R5° (example 6), R10° (example 7), R20° (example 8), R25° (example 9), R30° (example 10), and R35° (comparative example 2). The same cutting test and estimation as the example 1 were conducted on these examples 6 to 10 and the comparative example 2. As a test result, with respect to the examples 6 to 10, the working till 30 mm, that is, one-shape working could be performed, and the original working shape could be achieved. Particularly with respect to the examples 1 and 7, chattering vibration was very small, the cut state was stable, the end mill damage state showed normal wear having a slight wear width and the machined surface was excellent. A slightly minute chipping was observed with respect to the example 10. With respect to the comparative example 2, chipping was observed, and chattering vibration and cutting sound were somewhat intense.

EXAMPLE 11

A radius end mill in which the gash working of the bottom edge 2 and the gash working of the R edge 1 were carried out through a series of working and that the edge ridge lines of the R edge and the bottom edge formed one convex curved line was manufactured as an example 11 in the same manner as the example 1, and the same cutting test was conducted on the example 11. As a result, no edge portion occurred and thus the chipping could be suppressed. In addition, the chips discharging performance could be enhanced, the chattering vibration could be further suppressed, the cut state was more stable, and the end mill state after one-shape working showed that the wear was normal wear having a further smaller wear width.

[Fourth Embodiment]

A fourth embodiment of the radius end mill of the present invention will be described with reference to FIG. 7.

Figure 7:
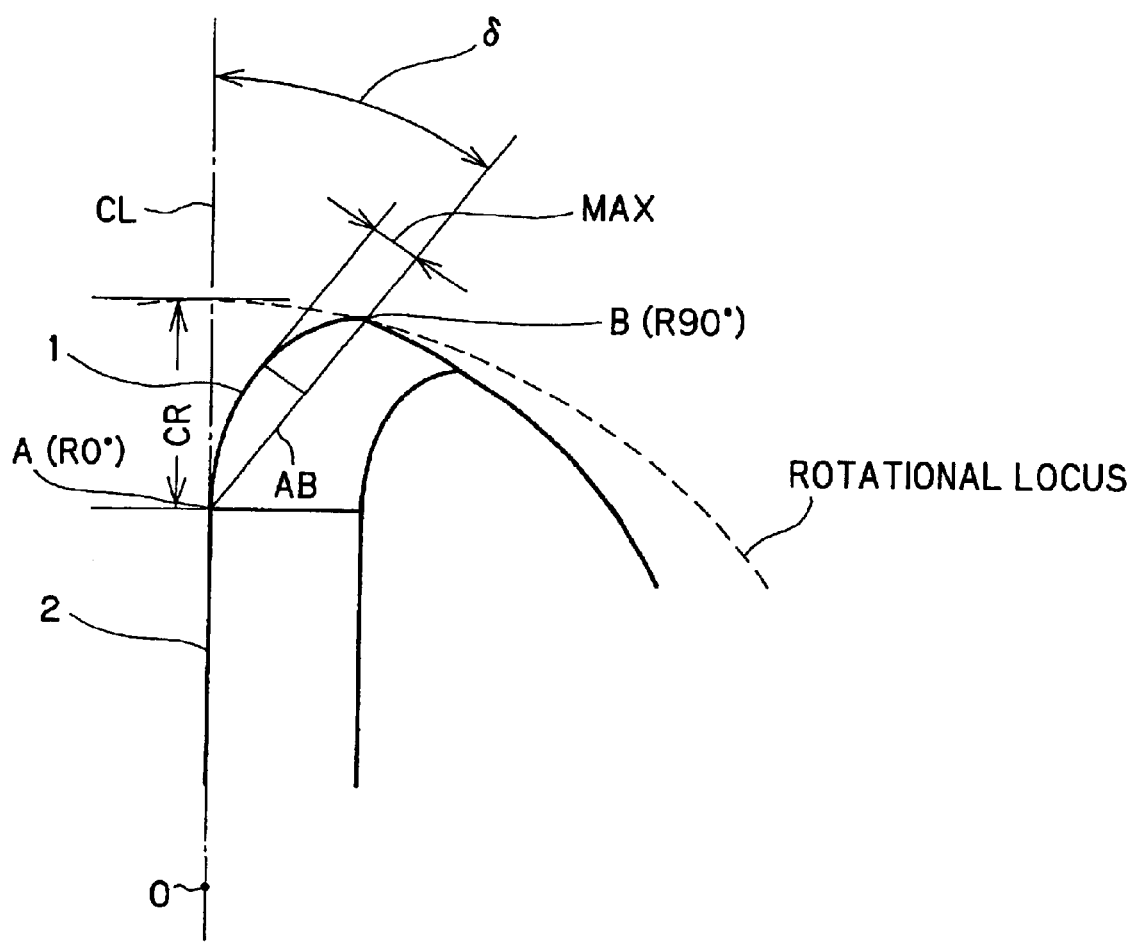
FIG. 7 is an enlarged plan view showing the end portion of the radius end mill of fourth embodiment when viewed along the axial direction of the radius end mill.

FIG. 7 is an enlarged plan view showing the end portion of the radius end mill of this embodiment when viewed along the axial direction of the radius end mill (this view will be hereinafter referred to as "end-mill axial direction view").

According to the fourth embodiment of the present invention, a line segment AB passing the connecting points A (R0°) and B (R90°) of the R edge 1 is inclined with respect to a line CL (represented by one dotted line) passing the connecting point A (R0°) and the rotational center O of the end of the radius end mill by 10° to 50°, and the maximum value (MAX) of the overhang amount (length) of the edge ridge line of the R edge 1 which outwardly overhangs from the line segment AB in a convex shape in the end-mill axial direction view is set to 15% to 30% of the corner R radius CR. The rotational center O means the rotational center of the cutting edges (bottom and R edges), and the rotational locus of the cutting edges around the rotational center is represented by a dotted line.

According to this embodiment, under the condition that the inclination angle δ of the line segment AB with respect to the line CL is set to 10° to 50°, the cutting of a workpiece is gradually advanced in the direction from the R0° site to the R90° site of the R edge 1, so that the cutting performance can be kept and the cutting force can be reduced.

If the inclination angle δ is less than 10°, the above effects are lowered. If the inclination angle δ is more than 50°, the thickness of the R edge 1 itself is too small, and the R edge 1 is fractured by the cutting force in the end mill axial direction. The inclination angle δ of the R edge 1 is more preferably set to 20° to 40°, and it is more preferably set to 20° to 30° when used in the three-dimensional working because the cutting force in the end mill axial direction is larger.

As described above, according to this embodiment, the maximum value (MAX) of the overhang amount (length) of the edge ridge line of the R edge 1 which outwardly overhangs from the line segment AB in a convex shape is set to 15% to 30% of the corner R radius CR on the sectional view taken along the axial direction of the radius end mill. If the maximum value EM is less than 15%, the convex shape of the edge ridge line of the R edge 1 with respect to the line segment AB has little effect on the cutting performance. Therefore, the cutting performance could not be enhanced. On the other hand, if the maximum value MAX is more than 30%, the convex shape is distorted and the curvature of the convex shape is large, so that the mechanical strength of the R edge 1 is reduced.

The maximum value MAX of the overhang amount of the edge ridge line of the R edge 1 is preferably set to 20% to 30% of the corner R radius CR.

Furthermore, according to this embodiment, the position on the edge ridge line of the R edge 1 at which the maximum value MAX of the overhang amount is achieved (hereinafter referred to as "MAX position") may be set to a position in the area between the R30° position to the R50° position on the R edge 1. If the MAX position is out of this area, the convex shape would be distorted. In this case, the cutting performance is lowered, the R edge 1 is not smoothly connected to the bottom edge 2 or the outer peripheral edge 3, so that some edge portion is apt to occur, the cutting force is apt to increase and abnormal wear is apt to occur.

As described above, according to this embodiment, the edge mechanical strength of the R edge 1 is enhanced and the cutting force is reduced. Therefore, in a working having a large cutting amount such as a rough working, the fracture and chipping of the R edge 1 can be suppressed and the high-feed cutting in which the feed per tooth is large can be performed.

Here, in order to further suppress occurrence of any edge portion, the gash working of the bottom edge and the gash working of the R edge may be performed by a series of gash working so that the edge ridge lines of the R edge and the bottom edge forms one convex curved line, thereby enhancing the resistance of the R edge to the fracture and the chipping.

Furthermore, it is advantageous that the number of cutting edges (cutting edge sets) is increased to perform high-efficiency cutting. In the case of a workpiece having a corner portion, when a multi-edge end mill having four or more cutting edges is applied to the workpiece, simultaneously cutting edges exist at the corner portion, so that chattering vibration is liable to occur due to resonance. Therefore, the number of the cutting edges is preferably set to three. In addition, the lifetime of the radius end mill (R edge or the like) can be enhanced by applying hard coating of TiAlN or the like or lubricative coating of Cr type.

Preferable examples according to the first embodiment of the present invention will be described hereunder in detail.

EXAMPLES 1 TO 5

3-cutting-edge type radius end mills formed of ultrafine particle cemented carbide in which the edge diameter is set to 12 mm, the corner R radius CR is set to 2 mm and the cutting edges are coated with TiAlN, are commonly used. In these radius end mills, the inclination angle δ of the R edge 1 is set to 5° (comparative example 1), 10° (example 1), 20° (example 2), 30° (example 3), 40° (example 4), 50° (example 5) and 60° (comparative example 2).

Prehardened steel of HRC 40 was used a workpiece, and a grooved pocket shape of 150 mm in length, 18 mm in width, 30 mm in depth and 3° in single angle of the side wall was formed by using the contour line operation using air blow under the conditions: a rotational number of 2600 revolutions per minute, a table feed speed of 1250 mm/min, a feed per tooth of 0.16 mm/tooth and a tool overhang length of 65 mm at a pitch of 0.6 mm in the tool axial direction. After the cutting test, the tool damage state was observed.

As a result of the cutting test, in the examples 1 to 5 of the fourth embodiment, the working till 30 mm, that is, one-shape working could be performed, and the original working shape could be achieved. Particularly in the examples 2 and 3, chattering vibration was very small and the cut state was stable. Although slightly minute chipping was observed in the example 5, the wear was normal wear having a slight wear width and the machined surface was excellent in the other examples. In the example 4, chattering vibration slightly occurred and the cutting sound was large. In the comparative example 1, the chattering vibration and the cutting sound were intense from the initial cutting stage, the damage state of the end mill after one-shape working showed that large chipping occurred in the R edge, and no original working shape was achieved. Furthermore, in the comparative example 2, the thickness of the R edge itself was too thin, and the R edge was fractured at the initial cutting stage to expire its lifetime.

EXAMPLES 6 TO 9

Radius end mills are manufactured in the same manner as the example 1, and the maximum value EM of the overhang amount of the convex-shaped portion (the edge ridge line of the R edge 1) from the line segment AB with respect to the corner R radius CR is set to 15% (example 6), 20% (example 7), 25% (example 8), 30% (example 9) and 35% (comparative example 3), that is, the actual distance thereof is set to 0.3 mm (example 6), 0.4 mm (example 7), 0.5 mm (example 8), 0.6 mm (example 9) and 0.7 mm (comparative example 2).

The same cutting test and estimation as the examples 1 to 5 were conducted on these examples. As a result of the cutting test, chattering vibration occurred slightly and slight cutting sound occurred in the example 6. However, chattering vibration was very small and the cut state was stable in the examples 7 to 9. Slightly minute chipping was observed in the comparative example 3, however, the wear was normal wear having a slight wear width and the machined surface was excellent in the other examples.

EXAMPLES 10 TO 16

Radius end mills are manufactured in the same manner as the example 1, and in these radius end mills, the maximum overhang amount (EM) position of the R edge 1 is set to the R25° position (example 10), the R30° position (example 11), the R35° position(example 12), the R40° position (example 13), the R45° position (example 14), the R50° position (example 15) and the R55° position (example 16). The same cutting test and estimation as the examples 1 to 5 were conducted on these examples. As a result of the cutting test, with respect to all the radius end mills, the working till 30 mm, that is, one-shape working could be performed, and the original working shape could be achieved. Particularly in the examples 11 to 15, chattering vibration was very small, the cut state was stable, the end mill damage state showed normal wear having a slight wear width, and the machined surface was excellent. An edge portion was observed at the connection position to the outer peripheral edge in the example 10 and at the connection position to the bottom edge in the example 16, the convex-shaped curved line of the R edge 1 was slightly distorted, and slight chattering vibration and chipping of the edge portion occurred.

EXAMPLE 17

A radius end mill was manufactured as an example 17 in the same manner as the examples 1 to 5 while the gash working of the bottom edge 2 and the gash working of the R edge 1 were performed by a series of working so that the edge ridge lines of the R edge 1 and the bottom edge 2 form one convex curved line as shown in FIG. 7. The same cutting test and estimation as the examples 1 to 5 were conducted. As a result of the cutting test, not only chipping was suppressed because of no edge portion, but also the chips discharging performance could be enhanced. Therefore, the chattering vibration was further reduced, the cut state was stable, the end mill damage state after one-shape working was finished showed normal wear having a further-reduced wear width.

[Fifth Embodiment]

Figure 8:
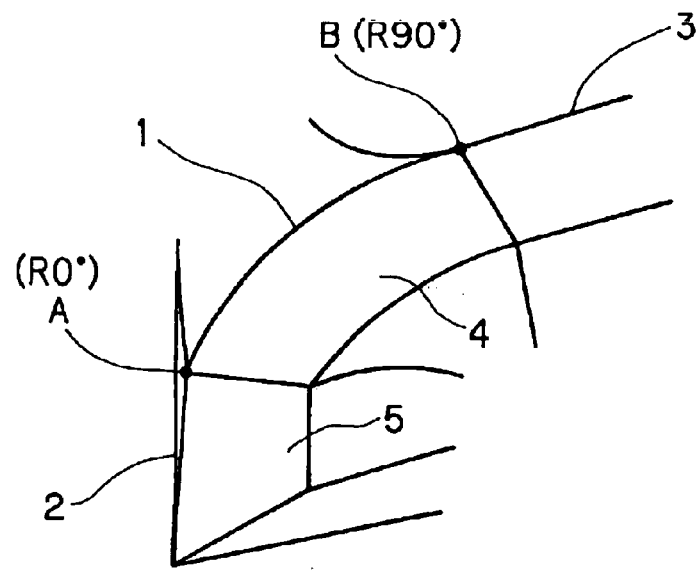
FIG. 8 is an R45°-direction view showing the end portion of the radius end mill according to a fifth embodiment of the present invention.

In the fourth embodiment described above, the position on the edge ridge line of the R edge 1 at which the maximum value EM of the overhang amount is achieved (that is, "EM position") is set in the area between the R30° position and the R50° position on the R edge 1 in the plan view of the end portion of the radius end mill when viewed along the end mill axial direction. According to a fifth embodiment of the present invention, the R edge 1 is designed to be curved in a convex shape in a corner R45°-direction view of the radius end mill. Here, the corner R45°-direction view of the radius end mill means a perspective view of the radius end mill achieved when the radius end mill is viewed in a direction intersecting to the tool axial direction (l—l) at 45° with the connecting point A (R0° position) of the R edge 1 set as an anchoring point as shown in FIG. 8.

Figure 9:
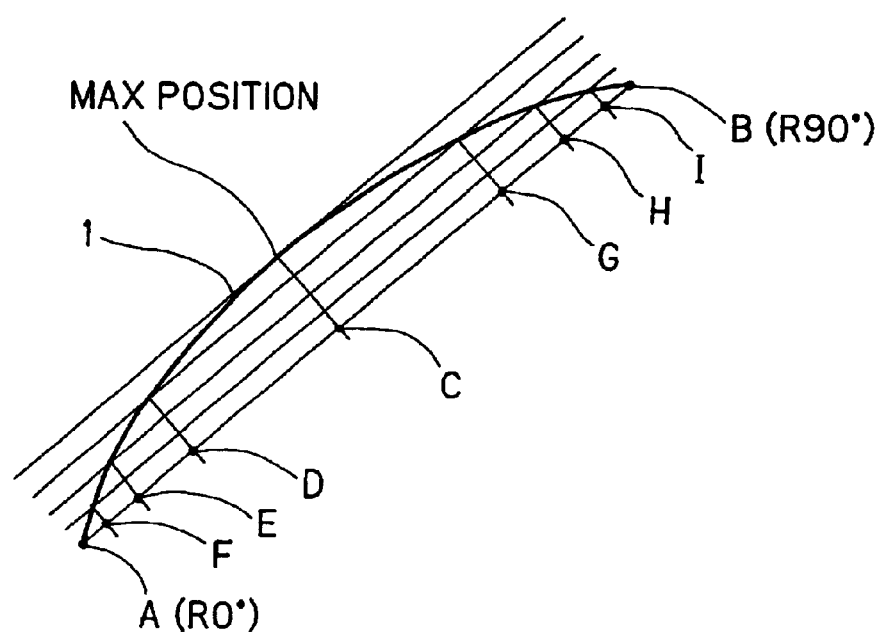
FIG. 9 is an enlarged view of the R edge 1 of FIG. 8 in the corner R45°-direction view.

FIG. 9 is an enlarged view of the R-edge 1 in the corner R45°-direction view. In FIG. 9, C represents the projection position on the line segment AB (passing through the R0° position (A) and the R90° position (B) of the R edge 1) achieved by projecting onto the line segment AB the position corresponding to the maximum overhang amount (length) (corresponding to the maximum value EM of the overhang amount in FIG. 7) of the convex-shaped R edge 1 with respect to the line segment AB, D represents a projection position on the line segment AB achieved by projecting onto the line segment AB a position which corresponds to ¾ of the maximum overhang amount of the convex-shaped R edge 1 and is nearer to the connecting point A, E represents a projection position on the line segment AB achieved by projecting onto the line segment AB a position which corresponds to ½ of the maximum overhang amount of the convex-shaped R edge 1 and is nearer to the connecting point A, and F represents a projection position onto the line segment AB achieved by projecting onto the line segment AB a position which corresponds to ¼ of the maximum overhang amount of the convex-shaped R edge 1 and is nearer to the connecting point A.

According to the fifth embodiment, the length of the line segment CD, DE, EF, FA is varied to be gradually reduced in this order, and the variation amount of the length of the line segments is gradually reduced as shown in FIG. 9. Furthermore, the length of the line segment CD is set to 50% or more of the length of the line segment AC. This design of the R edge 1 enhances the resistance to chipping.

Particularly, with respect to the high-feed cutting where the feed per tooth is extremely increased, the cutting amount in the axial direction of the tool is estimated to correspond to about 30% of the corner R radius at a general site, and chipping or fracture frequently occurs particularly in the area between R0° position and R45° position in the corner R edge, that is, at the bottom edge side of the corner R edge. Accordingly, the corner R45°-direction view is expected to more surely represent the shape of a site around the R edge 1 which is most associated with the cutting depth in the axial direction of the radius end mill.

In the case of the high-feed cutting in which the feed per tooth is extremely increased, in order to increase the resistance to chipping and the resistance to fracture, it is necessary to enhance the mechanical strength of the site around the R edge 1 which is most associated with the cutting depth in the axial direction of the radius end mill. Therefore, in order to enhance the mechanical strength, the R edge 1 is designed to have a convex shape particularly in the corner R45°-direction view of the radius end mill. This design can enhance the mechanical strength of the R edge 1 and exclude any edge-shaped site inducing chipping and fracture, thereby making the R edge 1 increase the resistance to chipping and fracture.

Furthermore, a portion around the R edge 1 which mainly contributes to the cutting and is associated with the cutting depth in the axial direction of the radius end mill (hereinafter referred to as "R-edge site") can be enhanced in mechanical strength. Particularly, the cutting load is concentrated to the site around the R edge (R-edge site) which is associated with the cutting depth in the axial direction, and thus the length of the line segment CD is set to 50% or more of the length of the line segment AC.

In the case of the high-feed cutting, the cutting amount in the tool axial direction is equal to about 30% of the corner R radius at a general working site. Therefore, if the length of the line segment CD is set to 50% or more of the length of the line segment AC, the R-edge site which is associated with the cutting depth in the tool axial direction surely exists in the area corresponding to the line segment CD. Here, since the length of the line segment CD at the R-edge site which is associated with the cutting depth in the tool axial direction is longer than that at the other sites, the curvature of the R edge site associated with the cutting depth in the tool axial direction is suppressed. Therefore, through the high-feed cutting, a proper shape can be achieved, the mechanical strength of the R-edge site associated with the cutting depth in the tool axial direction can be enhanced, the resistance to chipping and fracture of the R edge can be increased, and a stable tool lifetime can be achieved. Here, Here, in consideration of the balance in cutting performance with the other sites, the upper limit of the length of the line segment CD is preferably set to 70% or less of the line segment AC, and further preferably set to 60% or less of the line segment AC.

As described above, the cutting amount in the tool axial direction is set to about 30% of the corner R radius at a general working site, and thus an R-edge portion which extends from the intermediate point thereof toward the bottom edge side mainly contributes to the cutting. According to this embodiment, the length of the line segment AC may be set to any value in the range from not less than 40% to less than 50% of the length of the line segment AB. That is, the position of the maximum overhang amount of the convex shape from the line segment AB is located in the area extending from the intermediate point of the R edge to the bottom edge, whereby the curvature of the R edge in the area concerned is increased, the cutting performance can be further kept by the distortion effect and the cutting force can be lowered.

Here, when the length of the line segment AB is set to be less than 40% of the length of the line segment AB, the R-edge site associated with the cutting depth in the axial direction may be located to be nearer to the R90° position (the outer peripheral edge side) than the maximum overhang-amount position, and thus it is concerned that the maximum overhang-amount position is contained in the site mainly contributing to the cutting. In addition, The curvature in the area between the intermediate point and the connecting point B of the R edge 1 is excessively increased, and the shape of the R edge is distorted as a whole. Therefore, in consideration of the mechanical strength, the length of the line segment AC is set to not less than 40% of the length of the line segment AB. This design can provide the R edge with excellent machinability and high mechanical strength, and the cutting performance of the R edge which contains the R-edge site and mainly contributes to the cutting performance can be kept, and the cutting force can be lowered.

In the corner R45°-direction view of the radius end mill, the maximum value of the overhang amount of the convex shape of the R edge may be set to a value in the range from 15% to 25% of the corner R radius, whereby the proper curvature of the R edge can be achieved and the excellent cutting performance and mechanical strength can be achieved. Here, if the maximum overhang amount of the convex shape is less than 15% of the corner R radius, and the curvature is reduced, the cutting performance is lowered. On the other hand, if the maximum overhang amount of the convex shape is more than 25%, the curvature is increased and the mechanical strength is weakened. Therefore, the maximum overhang amount of the convex shape is set to a value in the range from 15% to 25% of the corner R radius.

In a case where the contour line working is carried out on the substantially vertical cavity wall, the cut-in operation in the axial direction is repeated, and thus the cutting is carried out by using the whole body of the R edge in the fourth and subsequent cut-in operations. Therefore, as in the case of the line segment AC, when G represents a projection position on the line segment AB achieved by projecting onto the line segment AB a position which corresponds to ¾ of the maximum overhang amount of the convex-shaped R edge 1 and is nearer to the connecting point B, H represents a projection position on the line segment AB achieved by projecting onto the line segment AB a position which corresponds to ½ of the maximum overhang amount of the convex-shaped R edge 1 and is nearer to the connecting point B, and I represents a projection position onto the line segment AB achieved by projecting onto the line segment AB a position which corresponds to ¼ of the maximum overhang amount of the convex-shaped R edge 1 and is nearer to the connecting point B, the line segments CG, GH, HI, IB on the line segment AB may be gradually reduced in length in this order, and the variation amount thereof may be also gradually reduced.

The rake face of the R edge may be designed to have a convex-shaped curved surface in the tool axial direction. In this case, the mechanical strength can be enhanced, the chips discharging performance can be enhanced, the fracture of the R edge can be suppressed, and the cutting force can be reduced. In addition, even in the high-feed cutting in which the feed per tooth is high, the tool lifetime can be further increased. Here, in order to further attain the mechanical strength of the R edge, the rake angle of the R edge is preferably set to a negative value, and the range thereof is preferably set to −15° to −30°.

Furthermore, it is advantageous that the number of cutting edges (cutting edge sets) is increased to perform high-efficiency cutting. In the case of a workpiece having a corner portion, when a multi-edge end mill having four or more cutting edges is applied to the workpiece, simultaneously cutting edges exist at the corner portion, so that chattering vibration is liable to occur due to resonance. Therefore, the number of the cutting edges is preferably set to three. Furthermore, the lifetime of the radius end mill (R edge or the like) can be enhanced by applying hard coating of TiAlN or the like or lubricative coating of Cr type.

Net, preferable examples according to the first embodiment of the present invention will be described hereunder in detail.

EXAMPLE 1

A 3-cutting-edge type radius end mill formed of ultrafine particle cemented carbide in which the edge diameter is set to 10 mm, the corner R radius is set to 2 mm and the cutting edges are coated with TiAlN is manufactured. In the corner R45°-direction view of FIGS. 8 and 9, the R edge 1 is curved in a convex shape, and when C represents the projection position on the line segment AB (passing through the R0° position (A) and the R90° position (B) of the R edge 1) achieved by projecting onto the line segment AB the position corresponding to the maximum overhang amount (length) (corresponding to the maximum value EM of the overhang amount in FIG. 7) of the convex-shaped R edge 1 with respect to the line segment AB, D represents a projection position on the line segment AB achieved by projecting onto the line segment AB a position which corresponds to ¾ of the maximum overhang amount of the convex-shaped R edge 1 and is nearer to the connecting point A, E represents a projection position on the line segment AB achieved by projecting onto the line segment AB a position which corresponds to ½ of the maximum overhang amount of the convex-shaped R edge 1 and is nearer to the connecting point A, F represents a projection position onto the line segment AB achieved by projecting onto the line segment AB a position which corresponds to ¼ of the maximum overhang amount of the convex-shaped R edge 1 and is nearer to the connecting point A, G represents a projection position on the line segment AB achieved by projecting onto the line segment AB a position which corresponds to ¾ of the maximum overhang amount of the convex-shaped R edge 1 and is nearer to the connecting point B, H represents a projection position on the line segment AB achieved by projecting onto the line segment AB a position which corresponds to ½ of the maximum overhang amount of the convex-shaped R edge 1 and is nearer to the connecting point B, and I represents a projection position onto the line segment AB achieved by projecting onto the line segment AB a position which corresponds to ¼ of the maximum overhang amount of the convex-shaped R edge 1 and is nearer to the connecting point B, the maximum value of the overhang amount of the convex shape of the R edge 1 is set to 20% of the corner R radius (i.e., 0.4 mm), the lengths of the line segments CD, DE, EF, FA are set to 0.835 mm, 0.285 mm, 0.205 mm and 0.155 mm respectively, and the lengths of the line segments CG, GH, HI, IB are set to 0.910 mm, 0.355 mm, 0.195 mm, 0.175 mm, the line segments CD, DE, EF, FA are gradually reduced in this order while the line segments CG, GH, HI, IB are gradually reduced in this order, and further the variation amount is gradually reduced for the line segments CD, ED, EF, FA and for the line segments CG, GH, HI, IB. Here, the length of the line segment AC is set to 47.5% of the length of the line segment AC, and the length of the line segment CD is set to 56.4% of the length of the line segment AC. The rake angle of the R edge is set to −25° in the tool radial direction.

Prehardened steel of HRC 40 was used a workpiece, and a grooved pocket shape of 100 mm in length, 65 mm in width, 30 mm in depth and having a slope of 3° on the side wall was formed by using the contour line operation using air blow under the cutting conditions: a rotational number of 1680 revolutions per minute, a table feed speed of 4200 mm/min, a feed per tooth of 0.625 mm/tooth and a tool overhang length of 40 mm at a cutting depth of 0.6 mm in the tool axial direction. After the cutting test, the tool damage state was observed.

For comparison, the radius end mills disclosed in JP-A-7-246508 and JP-A-11-216609 were manufactured as comparative examples 1 and 2 in the same manner as the example 1, and the same cutting test as the example 1 was conducted on the comparative examples 1 and 2.

As a result of the cutting test, with respect to the example 1, no chattering vibration was little observed and stable working could be performed to achieve one pocket shape. Furthermore, no chipping occurred at the R-edge site associated with the cutting depth in the axial direction of the radius end mill, the tool wear was normal wear and the cutting was sufficiently still possible. On the other hand, with respect to the comparative examples 1 and 2, chipping occurred at the R-edge site associated with the cutting depth in the axial direction at the initial cutting stage, and chattering vibration was intense. At the time when 30% of one pocket shape was formed, that is, at the time point corresponding to the depth of 9 mm, chipping was intensified and the lifetime was expired.

EXAMPLES 2 TO 5

In the same manner as the example 1, radius end mills are manufactured under the condition that the maximum overhang amount of the convex shape of the R edge 1 shown in FIG. 9 with respect to the corner R radius was set to 10% (example 2), 15% (example 3), 25% (example 4) and 30% (example 5), that is, set to 0.2 mm (example 2), 0.3 mm (example 3), 0.5 mm (example 4) and 0.6 mm (example 5), and the same cutting test as the example 1 in which the maximum overhang amount of the convex shape of the R edge with respect to the corner R radius is set to 20%, that is, 0.4 mm.

As a result of the cutting test, with respect to the examples 1, 3, 4, one pocket shape could be stably performed with little chattering vibration, no chipping occurred, the tool wear was normal wear and the cutting was sufficiently still possible. Furthermore, with respect to the examples 2 and 5, one pocket shape could be formed. However, slight chattering vibration occurred and cutting sound was slightly intense in the example 2. With respect to the example 5, minute chipping was observed at the R-edge site associated with the cutting depth in the axial direction.

EXAMPLE 6

A radius end mill in which the rake face of the R edge is formed to have a convex-shaped curves surface in the tool axial direction is manufactured as the example 6 in the same manner as the example 1, and the same cutting test as the example 1 was carried out. As a result of the cutting test, as compared with the example 1, chattering vibration was smaller, the cut state was also more stable, the end mill damage state showed normal wear having a slight wear width and the machined surface was excellent.

Table 2 shows the average comparison result between the examples of the fifth embodiment and the comparative examples (prior art) when the cutting test was conducted under the condition that a 3-cutting-edge type radius end mill formed of ultrafine particle cemented carbide in which the tool diameter was set to 12 mm, the corner R radius CR was set to 2 mm and the cutting edges were coated with TiAlN was used, prehardened steel of HRC 40 was used as a workpiece, and one pocket shape of 150 mm in length, 18 mm in width, 30 mm in depth and 3° in single angle of the side wall was formed by using the contour line operation using air blow (dry) at a rotational number of 26000 revolutions per minute, a table feed speed of 1250 mm/min, a feed per tooth of 0.16 mm, a Z pick (a pick in the axial direction) of 0.5 mm, an XY pick (a pick in the radial direction) of 3 mm.

TABLE 2

|  | PRIOR ART | PRIOR ART | EMBODIMENT |
|---|---|---|---|
| 45°-DIRECTION VIEW | CD is not more than 50% of AC AC is not less than 50% of AB | substantially linear | CD is not less than 50% of AC AC is not more than 50% of AB |
| RESULT | Fractured | chipped | normal wear |

[Sixth Embodiment]

With respect to the conventional radius end mill, little consideration has been paid to the relief angle γ in the normal-line direction of the R edge, and the relief angle γ in the normal-line direction of the R edge is substantially fixed over the whole area from the R0° position to the R90° position of the R edge. Accordingly, when the feed per tooth is extremely increased, the relief angle γ of the flank of the R edge 1 in the tool radial direction runs short in the area between the R0° position and the R45° site of the R edge 1. As a result, the wear of the flank of the R edge is intensely promoted and thus the lifetime of the R edge is expired, or in extreme cases, heel impingement occurs and it becomes impossible to carry out the cutting.

Furthermore, as compared with the area between the R0° position and the R45° site of the R edge 1, the cutting amount itself in the tool radial direction is larger, the cutting speed is higher and the cutting load is liable to be concentrated in the area between the R45° site and the R90° position of the R edge 1. Therefore, in the area between the R45° site and the R90° position of the R edge 1, the mechanical strength of the R edge 1 cannot endure the cutting load, and further adhesion or the like is induced, so that the lifetime is expired due to fracture.

According to a sixth embodiment of the present invention, much attention is paid to the relief angle γ of the flank of the R edge 1. That is, according to the sixth embodiment, a radius end mill is designed so that the relief angle γ of the R edge in the normal-line direction thereof is gradually reduced from the R0° position to the R90° position of the R edge 1, and the relief angle γ at the R0° position of the R edge 1 is set to 10° or more.

Figure 10:
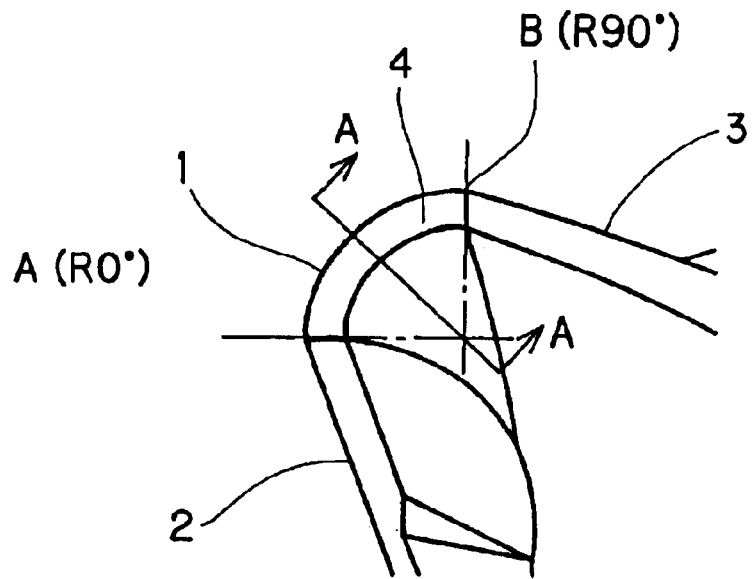
FIG. 10 is an enlarged side view of the end portion of the radius end mill according to a sixth embodiment of the present invention.
Figure 11:
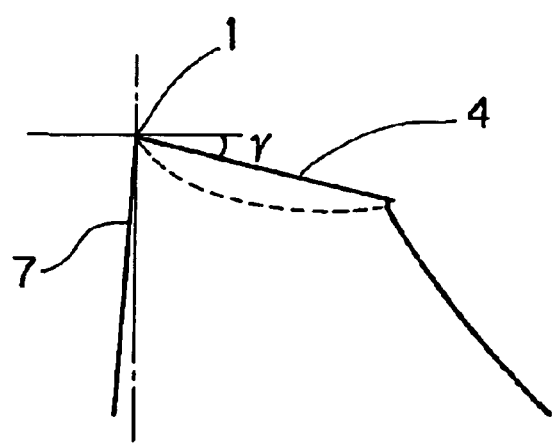
FIG. 11 is a cross-sectional view taken along a line A—A of FIG. 10.

FIG. 10 is an enlarged side view of the end portion of the radius end mill, and FIG. 11 is a cross-sectional view taken along a line A—A.

There is a tendency that the cutting amount of the R edge 1 is larger, the cutting speed is higher and the cutting load is more liable to be concentrated as shifting from the R0° position to the R90° position. Therefore, by gradually reducing the relief angle γ in the normal-line direction of the R edge from the R0° position to the R90° position, the mechanical strength of the R edge 1 can be more enhanced from the R0° position to the R90° position of the R edge 1. In addition, the clearance between the flank of the R edge and a workpiece can be kept substantially constant during cutting. The clearance between the flank of the R edge and the workpiece during cutting is determined by the relief angle in the tool rotational direction, and the relief angle in the tool rotational direction is reduced with respect to the relief angle γ in the normal-line direction around the R0° site. Therefore, the relief angle γ in the normal-line direction of the R edge 1 is increased in the direction to the R0° site of the R edge 1. Furthermore, the relief angle γ in the normal-line direction and the relief angle in the tool rotational direction are substantially equal to each other at the R90° site, and thus the relief angle γ in the normal-line direction of the R edge 1 is reduced in the direction to the R90° site of the R edge 1.

The clearance between the flank of the R edge 1 and the workpiece can be substantially constant by varying the relief angle γ in the normal-line direction as described above, so that the machinability (cutting performance) can be made stable and the high-feed cutting can be readily performed.

Secondly, according to this embodiment, the relief angle γ in the normal-line direction at the R0° site of the R edge 1 may be set to 10° or more. If the relief angle γ is less than 10°, no sufficient clearance is achieved between the flank 4 of the R edge 1 and the workpiece. Particularly in the high-feed cutting, heel impingement occurs and the cutting force due to the insufficient relief angle in the tool rotational direction is increased to induce adhesion or the like, so that the lifetime is reduced. Accordingly, the relief angle γ in the normal-line direction is preferably set to 12° or more. Furthermore, the upper limit of the relief angle γ is preferably set to 20° or less in consideration of the edge mechanical strength.

It is preferable that the relief angle γ in the normal-line direction is continuously varied from the R0° site to the R90° site in order to keep the clearance between the flank and the workpiece. Furthermore, the relief angle at the R90° site is preferably set to substantially the same value as the flank of the outer peripheral edge 3 so that the flank of the R edge 1 and the flank of the outer peripheral edge 3 can be smoothly connected to each other with no step therebetween. For example, the relief angle of the R edge 1 is preferably set in the range of ±1° with respect to the relief angle of the outer peripheral edge 3.

As described above, by applying this embodiment, the R edge 1 can have both the high mechanical strength and the excellent cutting performance, and the high-feed cutting in which the feed per tooth is extremely increased can be performed.

Thirdly, according to this embodiment, the flank of the R edge 1 may be designed in a linear shape (as indicated by a solid line in FIG. 11) or concave shape (as indicated by a dotted line in FIG. 11) in a cross-sectional view of the R edge which is taken along the normal-line direction. With this design, the clearance between the flank of the R edge and the workpiece can be increased in the neighborhood of the edge tip of the cutting edge, wear and adhesion can be suppressed and the cutting force can be reduced, so that the lifetime of the R edge can be enhanced. Here, if the radius of curvature of the concave curved line is small, it affects heel impingement or edge mechanical strength. Therefore, the radius of curvature of the concave curved line is preferably set to 30 times of the radius of the R edge, and more preferably to 50 times or more.

Fourthly, according to this embodiment, chips generated by the R edge 1 are discharged through the rake face of the R edge, and thus a face constituting the rake face 7 of the R edge 1 may be designed to have a convex shape in the direction from the R0° site to the R90° site. With this design, the contact portion of the rake face with the chips can be reduced to thereby reduce the cutting force. Furthermore, the cutting stress is prevented from concentrating to a part of the rake face 7, and thus dispersed in all directions. In addition, any step for disturbing flow of chips can be omitted.

Fifthly, according to this embodiment, the rake angle from the R0° site to the R90° site of the R edge may be set to a negative angle in both the normal-line direction and the tool radial direction of the R edge 1, whereby the mechanical strength of the R edge 1 can be enhanced, and the high-feed cutting can be performed with further enhanced lifetime.

It is advantageous that the number of cutting edges (cutting edge sets) is increased to perform high-efficiency cutting. In the case of a workpiece having a corner portion, when a multi-edge end mill having four or more cutting edges is applied to the workpiece, simultaneously cutting edges exist at the corner portion, so that chattering vibration is liable to occur due to resonance. Therefore, the number of the cutting edges is preferably set to three. Furthermore, the lifetime of the radius end mill (R edge or the like) can be enhanced by applying hard coating of TiAlN or the like or lubricative coating of Cr type.

Net, preferable examples according to the sixth embodiment of the present invention will be described hereunder in detail.

EXAMPLE 1

A 4-cutting-edge type radius end mill formed of ultrafine particle cemented carbide coated in which the edge diameter is set to 12 mm, the corner R radius is set to 2 mm and the helix angle of the outer peripheral edge 3 is set to 43° is manufactured as an example 1. The cutting edge portions of the radius end mill are coated with TiAlN.

As shown in FIG. 10, the relief angle in the normal-line direction at the R0° site (A) is set to 12°, and it is gradually reduced in the direction to the R90° site (B). The flank 4 of the R edge 1 is designed in a substantially linear shape in the cross-sectional view taken along the normal-line direction of the R edge 1. Radius end mills having the same dimension as the example 1 are manufactured as comparative examples 1 and 2 so that the relief angle in the normal-line direction is substantially fixed to 8° (comparative example 1) or 12° (comparative example 2) over the area between the R0° site and the R90° site (comparative example 1).

The cutting test was conducted on the example 1 and the comparative examples 1 and 2 for comparison by carrying out the contour line operation using air blow under the cutting condition that prehardened steel of HRC40 was used as a workpiece, the rotational number was fixed to 2400 revolutions pre minute, the feed per tooth was varied like 0.1, 0.2, 0.3, 0.4 mm/tooth and the tool overhang length at a pitch of 0.5 mm in the end mil axial direction was set to 40 mm, and then the damage state was observed.

As a result of the cutting test, with respect to the example 1, little chattering vibration was observed until the feed per tooth reached 0.4 mm/tooth, that is, the feed reached 3840 mm/min, the working was stably carried out, no chipping occurred, and the tool wear was normal wear and kept sufficient cutting capability.

On the other hand, with respect to the comparative example 1, adhesion occurred on the flank of the R edge at the time when the feed per tooth was equal to 0.1 mm/tooth, that is, the feed was equal to 960 mm/min, and chattering vibration intensely occurred during cutting. Further, when the feed per tooth was set to 0.2 mm/tooth, that is, the feed was set to 1920 mm/min, chipping occurred at the R10° site of the R edge 1, and the lifetime was expired. With respect to the comparative example 2, chipping occurred in the area between the R80° site and the R90° site of the R edge 1 when the feed per tooth was set to 0.2 mm/tooth, that is, the feed was set to 1920 mm/min, and the chattering vibration was intensified. When the feed per tooth was set to 0.3 mm/tooth, that is, the feed was set to 2880 min/min, the chipping was intensified and the lifetime was expired.

EXAMPLES 2 TO 5

Radius end mills are manufactured in the same manner as the example 1 except that the relief angle in the normal-line direction at the R0° site of the R edge 1 is set to 10° (example 2), 15° (example 3), 20° (example 4) and 25° (example 5), and with respect to the examples 2 to 5 as well as the example 1, grooved pocket shape of 60 mm in length, 40 mm in width, 30 mm in depth and having a slope of 3° on the side wall was carried out by the contour line operation using air blow under the cutting conditions: a rotational number of 2400 revolutions per minute, a feed per tooth of 0.4 mm/tooth, a feeding of 3840 mm/min and a tool overhang length of 40 mm at a pitch of 0.5 mm in the end mill axial direction. After the cutting test, the tool damage state was observed.

As a result of the cutting test, in all the radius end mills, the working could be performed till a depth of 300 mm, that is, one-shape working could be performed, and the radius end mills were still allowed to carry out cutting. Particularly with respect to the example 1 and the example 3, the cut state was stable, and the tool damage state until a depth of 30 mm, that is, after the one-shape working was finished, showed normal wear having a slight wear width, and the machined surface was excellent. Furthermore, with respect to the example 4, no effect was observed in the cut state and the machined surface, however, minute chipping was observed at the edge tip in the R0° site of the R edge. With respect to the example 2, slight adhesion was observed on the flank at the R0° site, and with respect to the example 5, minute chipping occurred at the edge tip in the neighborhood of the R0° site and slight chattering vibration occurred, that is, the cut state was affected.

EXAMPLES 6 AND 7

Radius end mills are manufactured in the same manner as the example 1 except that the shape of the flank 4 of the R edge 1 on the cross-sectional view in the normal-line direction of the R edge is designed to have a concave curved line (example 6) or a convex curved line (example 7) with the radius of curvature of the concave or convex curved line set to 50 times of the corner R radius (for example, the radius of curvature is set to 100 mm), and the same cutting test and estimation as the examples 1 to 5) were conducted.

As a result of the cutting test, with respect to the example 7, the cut state was stable, the tool damage state until a depth of 30 mm, that is, after the one-shape working was finished showed normal wear having a slight wear width, and the machined surface was excellent. With respect to the example 7, chattering vibration slightly occurred. The tool damage state until a depth of 30 mm, that is, after the one-shape working was finished showed normal wear, however, adhesion was slight observed, and the wear width thereof was slightly larger than the examples 1 and 7.

EXAMPLE 9

A radius end mill is manufactured in the same manner as the example 1 except that a face constituting the rake face 7 of the R edge is designed to have a convex curved surface in the direction from the R0° site to the R90° site, and the same cutting test and estimation as the examples 1 to 5 were conducted.

As a result of the cutting test, with respect to the example 8, the cut state was stable even in the working at the corner portion of the pocket shape, the tool damage state until a depth of 30 mm, that is, after the one-shape working was finished showed normal wear having a slight wear width, and the machined surface was excellent. As compared with the example 1, the high-feed cutting could be performed more stable.

EXAMPLE 9

A radius end mill is manufactured in the same manner as the example 1 except that the rake angle from the R0° site to the R90° site of the R edge 1 is set to a negative value in the range from 0° to −10° in both the normal-line direction and the tool radial direction, and the same cutting test and estimation as the examples 1 to 5 were conducted.

As a result of the cutting test, the example 9 had more stable cut state, a smaller wear width and more excellent machined surface than the example 1.

[Seventh Embodiment]

According to this embodiment, the R edge 1 is equipped with a margin to further enhance the resistance to chipping and also enhance the R precision (the precision of the R edge). When plural R edges are equipped at the end portion of the radius end mill, the average width of the margin may be varied every R edge. Furthermore, the width of the margin of each R edge may be varied in the longitudinal direction of the margin (corresponding to the direction from the R90° position to the R0° position of the R edge 1).

Figure 12:
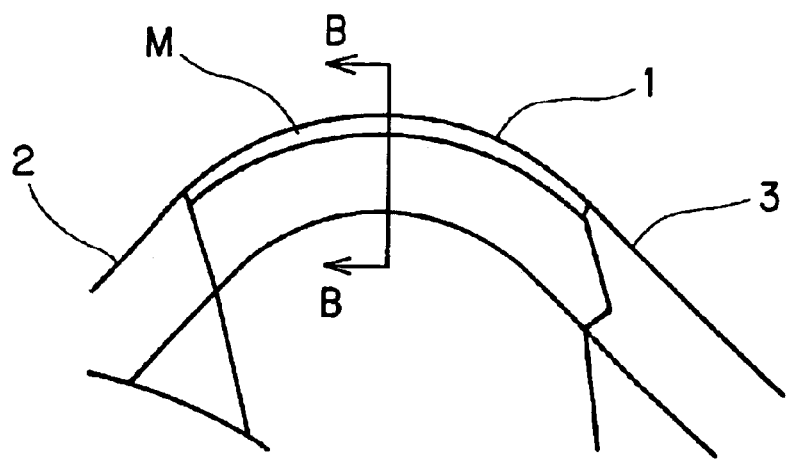
FIG. 12 is an enlarged view (R45° direction view) showing the corner portion containing the R edge 1, the bottom edge 2 and the outer peripheral edge 3 according to a seventh embodiment of the present invention.
Figure 13:
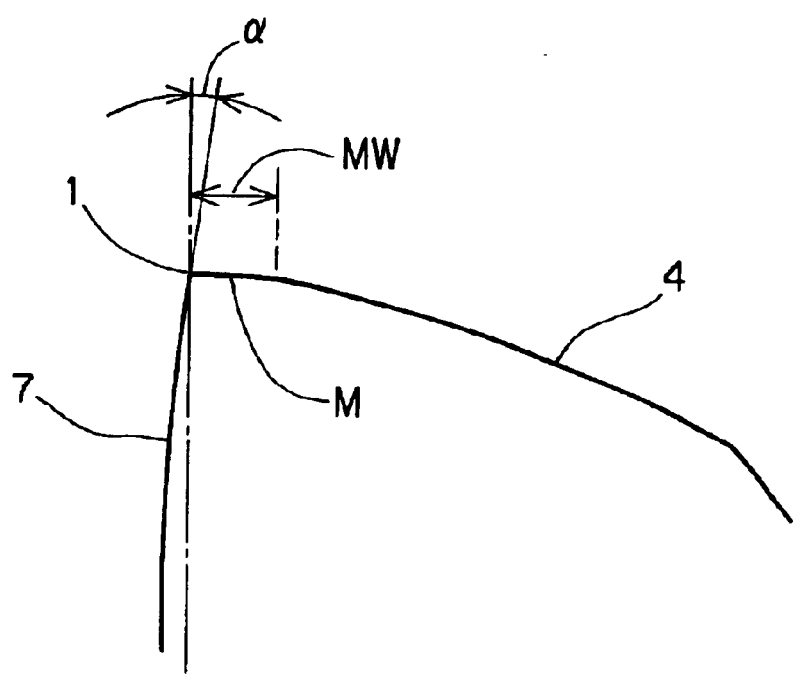
FIG. 13 is a cross-sectional view taken along a line B—B of FIG. 12.
Figure 14:
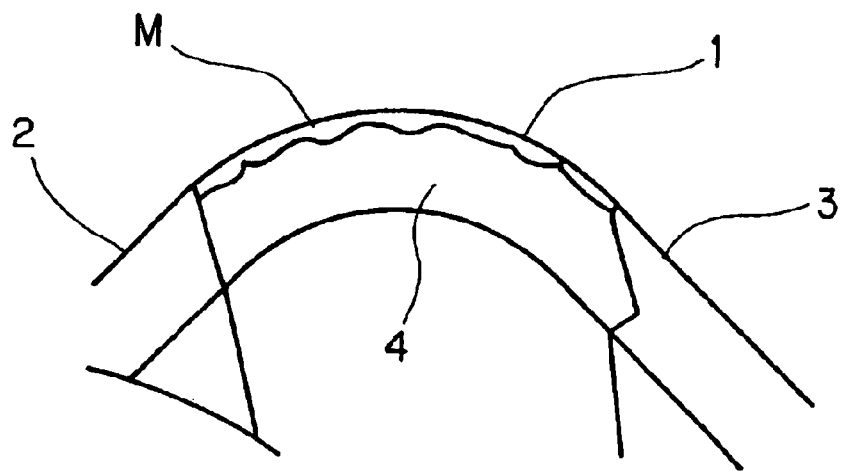
FIG. 14 is an enlarged view (R45° direction view) showing the corner portion containing the R edge 1, the bottom edge 2 and the outer peripheral edge 3 according to a modification of the seventh embodiment shown in FIG. 12 when the width of the margin M in each R edge is varied in a wavelike style.
Figure 15:
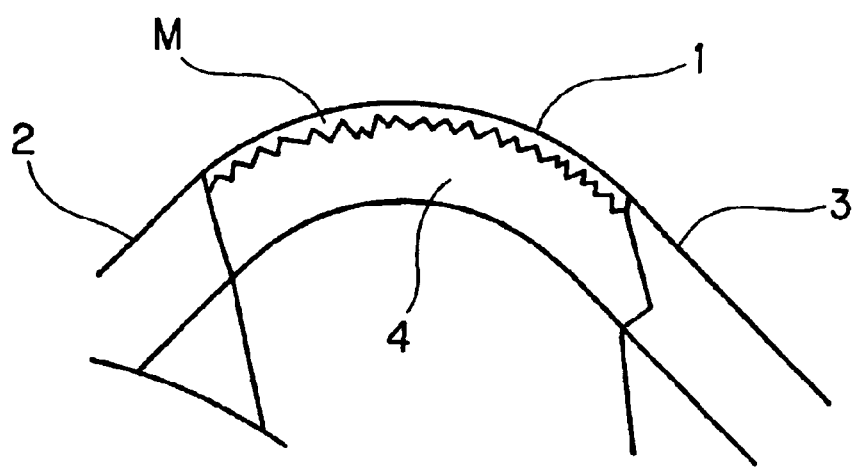
FIG. 15 is an enlarged view (R45° direction view) showing the corner portion containing the R edge 1, the bottom edge 2 and the outer peripheral edge 3 according to a modification of the seventh embodiment shown in FIG. 12 when the width of the margin M in each R edge is varied in a saw-tooth style.

FIG. 12 is an enlarged view (R45° direction view) showing the corner R portion containing the R edge 1, the bottom edge 2 and the outer peripheral edge 3, FIG. 13 is a cross-sectional view taken along a line B—B of FIG. 12 and FIGS. 14 and 15 are cross-sectional view taken along the line B—B of FIG. 12 when the width of the margin M in each R edge is varied in various styles.

For example, when the margin M is equipped to the R edge 1 so as to be located at the boundary between the R edge 1 and the flank 4 of the R edge 1 as shown in FIG. 12, the resistance of the R edge 1 to chipping can be enhanced. In addition, the R precision is determined by the precision of the margin portion, and the R precision at the tool side is readily achieved in the tool manufacturing process. Therefore, a radius end mill having high precision of ±0.01 mm can be manufactured.

On the other hand, the provision of the margin M increases the cutting force. In order to avoid this disadvantage, the width of the margin M may be varied every R edge. Accordingly, the cutting force per tooth (edge) in the cutting process is different among the respective R edges, and the same effect as the irregular pitch can be achieved. Therefore, the cutting load is stable, chattering vibration can be suppressed, the high-feed cutting can be supported and the high-efficiency cutting can be performed.

Furthermore, when the width of the margin M is varied in each R edge 1, the cutting force is varied every each site on each R edge 1, crimpy or segmented chips are generated, and the same effect as a roughing edge shape for rough working is achieved, so that the cutting force can be reduced and the high-efficiency working can be performed. Here, it is preferable as the variation style of the margin width MW that the margin is varied in a wavelike shape as shown in FIG. 14 or a saw-tooth shape. In this case, the variation may be regular or irregular.

Furthermore, according to this embodiment, the average width of the margin portion equipped to each R edge may be set to 0.15 mm or less. If the average margin width MW is more than 015 mm, the cutting force is large. The average margin width MW is preferably set to 0.1 mm or less. If the maximum value of the margin width MW is excessively small, the difference in margin width MW is little among the respective R edges or over the whole area of each R edge. Therefore, the maximum value of the margin width MW is preferably set to 0.02 mm or more.

The effect described above can be achieved in a case where the margin is equipped to the outer peripheral side portion of the R edge and no margin is equipped to the bottom edge side portion of the R edge. On the other hand, the effect on the R precision of the R edge cannot be achieved, however, the other effects can be achieved in a case where the margin is equipped to the bottom edge side portion of the R edge and no margin is equipped to the outer peripheral side portion of the R edge.

The provision of the margin increases the contact area with the workpiece, and thus increases the cutting force. However, by applying hard coating of TiAlN or the like applying lubricative coating of Cr type to the margin, the increase in the cutting force can be reduced. Furthermore, by carrying out a honing treatment or the like to round the edge tip, the lifetime to the high-efficiency cutting can be further increased.

Next, preferable examples according to this embodiment will be described hereunder.

EXAMPLE 1

A 3-cutting-edge type radius end mill formed of ultrafine particle cemented carbide coated in which the edge diameter is set to 12 mm and the corner R radius is set to 2 mm is manufactured as an example 1, and the cutting edge portions of the radius end mill are coated with TiAlN. In the example 1, the margin widths MW of the three R edges 1 are set to 0.08 mm, 0.06 mm, 0.04 mm respectively, that is, the ratio of the margin widths of the R edges are set in a ratio of 4:3:2, and the rake angle $\alpha$ in the normal-line direction at the R45° site of the R edge 1 is set to −5°, and the rake face 7 of the R edge 1 is designed to have a convex curved surface. Here, the corner R precision is ranged within ±0.005 mm with respect to the corner R radius (2 mm), and the corner R precision can be readily and very excellently achieved by providing the margin M.

Furthermore, a radius end mill is manufactured as a comparative example 1 in the same manner as the example 1 so that the same R edge shape is achieved, but the margin widths MW of all the three R edges are fixed to 0.04 mm. The example 1 and the comparative example 1 were subjected to the cutting test for comparison. In this cutting test, prehardened steel of HRC40 was used as a workpiece and grooved pocket shape of 150 mm in length, 18 mm in width, 30 mm in depth and having a single angle of 3° on the side wall was formed by using the contour line operation using air blow under the cutting condition that the rotational number was set to 2600 revolutions per minute, the feed per tooth was varied to 0.3, 0.4, 0.5, 0.6 mm/tooth and the tool overhang length was set to 65 mm at a cutting amount of 0.6 mm in the tool axial direction. After the cutting test, the cut state was observed.

As a result of the cutting test, with respect to the example 1 in which the margin width MW is made different among the R edges, little chattering vibration occurred until the feed per tooth reached 0.6 mm/tooth, that is, the table feed speed reached 4680 mm/min, and stable working was performed. However, with respect to the comparative example 1, chattering vibration was intensified at the feed per tooth of 0.4 mm/tooth, that is, at the table feed speed of 3120 mm/min, and the chattering vibration was very intense at the feed per tooth of 0.5 mm/tooth, that is, at the table feed speed of 3900 mm/min, so that the cutting was stopped.

EXAMPLES 2 AND 3

Radius end mill are manufactured in the same manner as the example 1 so that the average margin widths of the three R edges are set in the ratio of 4:3:2. The margin M of each R edge of each radius end mill thus manufactured is irregularly varied in the wavelike shape as shown in FIG. 14 (example 2) and in the saw-tooth shape as shown in FIG. 15. The same cutting test and estimation as the example 1 were carried out.

As a result of the cutting test, with respect to the examples 2 and 3, no chattering vibration was observed until the feed per tooth reached 0.6 mm/tooth, that is, the table feed speed reached 4680 mm/min, and further little chattering vibration was observed even at the feed per tooth of 0.65 mm/tooth, that is, the table feed speed of 5070 mm/min in an additive cutting test. Better results were achieved as compared with the example 1.

EXAMPLES 4 TO 9

Radius end mills are manufactured in the same manner as the example 1 so that the margin widths of the three R edges are set in the ratio of 4:3:2. In these radius end mills, the maximum average margin width of each R edge is set to 0.01 mm (example 4), 0.02 mm (example 5), 0.05 mm (example 6), 0.1 mm (example 7), 0.15 mm (example 8) and 0.2 mm (example 9), and the same cutting test and estimation were conducted on the examples 4 to 9 as well as the example 1.

As a result of the cutting test, with respect to all the examples 1 and 4 to 9, the working could be performed until the feed per tooth reached 0.6 mm/tooth, that is, the table feed speed reached 4680 mm/min. Particularly with respect to the examples 1 and 5 to 7, little chattering vibration was observed, and stable working could be performed. On the other hand, chattering vibration occurred at the pocket corner portion of the workpiece at the feed per tooth of 0.6 mm/tooth with respect to the examples 4 and 8 and at the feed per tooth of 0.5 mm/tooth with respect to the example 10. With respect to the example 4, minute chipping was slightly observed at the R edges, and with respect to the examples 8 and 9, adhesion was slightly observed at the margin portions of the R edges.

[Eighth Embodiment]

When the high-feed cutting is actually carried out, the cutting amount in the tool axial direction is normally set to the R radius of the R edge or less to suppress the cutting force. In the cavity wall working or the like, a part of the outer peripheral edge is brought into contact with a workpiece, and chips are discharged in the outer peripheral edge direction along the distortion of the R edge. Therefore, the damage of the outer peripheral edge in the neighborhood of the R edge is large, and particularly chips generated in the high-feed cutting are large in thickness, and the temperature thereof is increased due to cutting heat, so that chipping or fracture occurs in the outer peripheral edge in the neighborhood of the R edge, and the lifetime is expired. Furthermore, the cutting amount in the tool axial direction is set to the R radius or less, and thus no consideration has been hitherto paid to the outer peripheral edge.

Accordingly, according to an eighth embodiment of the present invention, the R edge is twisted and continuously connected to the outer peripheral edge spirally-formed on the outer periphery of the radius end mill, the helix (spiral)

angle of the outer peripheral edges is set to 35° to 55°, and a margin having a margin width of 0.02 to 0.2 mm is provided on the R edges and/or the outer peripheral edges. Furthermore, the R edges may be a sharp edge.

According to this embodiment, each R edge is twisted (torsional) so as to reverse with respect to the rotational direction of the radius end mill in a side view of the radius end mill. The torsion of the R edge can disperse impact shock when the R edge hits at the workpiece, and thus the resistance of the R edge to the fracture can be enhanced.

Next, the helix angle of the outer peripheral edge is set to 35° to 55° (high-helix angle) in order to enhance the chips discharging performance and disperse the force occurring when the chips come into contact with the outer peripheral edge. The helix angle of the outer peripheral edge is preferably set to 40° or more. If the helix angle is more than 55°, the mechanical strength of the edge tip is lowered, and the chips discharging direction is near to the helix direction of the outer peripheral edge, so that the outer peripheral edge is liable to suffer the cutting-heat effect and bite the chips. Therefore, the helix angle of the outer peripheral edge is set to 55° or less, and preferably to 50° or less. Here, by setting the helix angle of the outer peripheral edge to the high-helix angle, the outer peripheral edge can be smoothly connected to the twisted R edge, and the machinability can be enhanced. In addition, an edge occurring at the connecting portion between the outer peripheral edge and the R edge can be suppressed as much as possible, and thus the lifetime to the high-efficiency cutting can be lengthened.

Furthermore, according to this embodiment, the margin of 0.02 to 0.2 mm in width may be provided to the outer peripheral edge. In this case, not only the mechanical strength of the edge tip is enhanced, but also the clearance between the workpiece and the outer peripheral edge is excluded to thereby suppress the bite of the chips. Here, if the margin width of the outer peripheral edge is less than 0.02 mm, the effect of the margin of the outer peripheral edge is reduced. If the margin width is more than 0.2 mm, the cutting load is large and chattering vibration or the like is liable to occur. Therefore, the margin width of the outer peripheral edge is set to a value in the range from 0.02 mm to 0.2 mm.

Still furthermore, according to this embodiment, the R edge may be a sharp edge, that is, a cutting edge having no margin in order to enhance the machinability because the R edge is a site mainly contributing to the cutting and the cutting load is large when the R edge has a margin. The sharp edge defined in this specification may contain an edge which is subjected to a treatment of minutely rounding the edge tip by honing or the like.

Still furthermore, according to this embodiment, the rake angle of the outer peripheral edge may be set to 10° or less to enhance the mechanical strength of the edge tip, and it is preferably set to 5° or less. Here, the rake angle of the outer peripheral edge may be set to a negative angle.

Next, preferable examples of this embodiment will be described hereunder.

EXAMPLE 1

Figure 16:
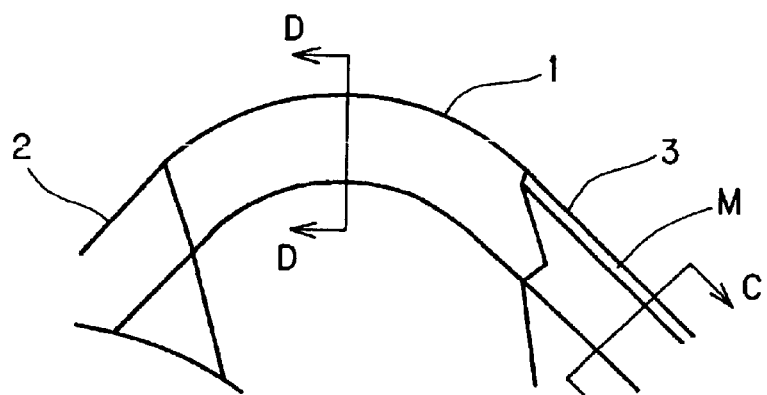
FIG. 16 is an enlarged view of the corner portion of a radius end mill according to an eighth embodiment in the R45°-direction view.

FIG. 16 is an enlarged view of the corner portion of the end of the tool in the R45°-direction view.

As an example 1 is used a 3-cutting edge type of radius end mill formed of ultrafine particle cemented carbide in which the edge diameter is set to 10 mm, the corner R radius is set to 2 mm, the outer peripheral helix angle is set to 43°, the cutting edges are coated with TiAlN and the outer peripheral edge 3 is provided with an outer peripheral margin M.

Figure 17:
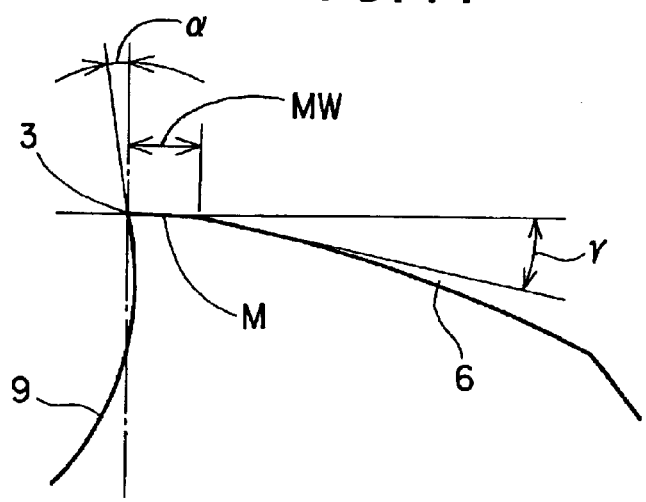
FIG. 17 is a cross-sectional view taken along a line C—C of FIG. 16.

FIG. 17 is a cross-sectional view taken along a line C—C of FIG. 16, that is, a cross-sectional view showing the outer peripheral edge 3, the rake face 9 thereof and the flank 5 thereof, which is taken in a direction perpendicular to the tool axial direction. The margin width MW of the outer peripheral edge 3 is set to 0.05 mm, the rake angle α of the outer peripheral edge 3 is set to +3°, and the relief angle γ of the outer peripheral edge is set to 12°.

Figure 18:
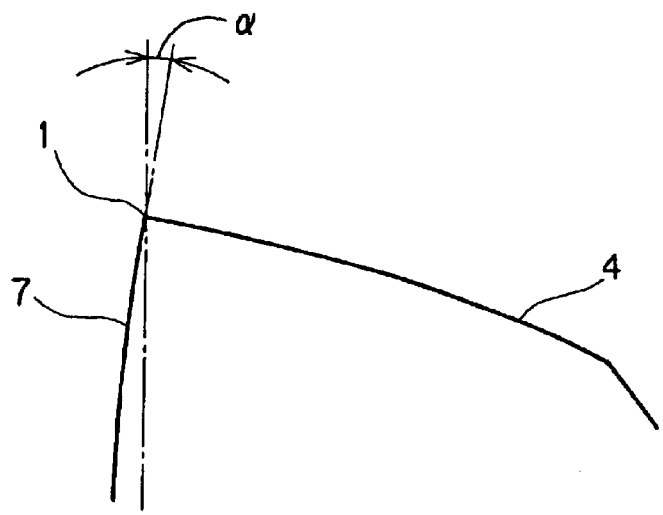
FIG. 18 is a cross-sectional view taken along a line D—D of FIG. 16.

FIG. 18 is a cross-sectional view taken along a line D—D of FIG. 16, that is, a cross-sectional view showing the R edge 1, the rake face 7 thereof and the flank 4 thereof, which is taken in a direction perpendicular to the tool axial direction. The R edge 1 is a sharp edge having no margin, the rake angle α in the normal-line direction at the R45° site is set to −5° and the rake face 7 of the R ridge is designed to have a convex curved surface.

A comparative example 1 is manufactured to have the same dimension as the example 1 so that no margin is provided to the outer peripheral edge. The cutting test was conducted on the example 1 and the comparative example 1 by conducting the contour line operation using air blow on a side surface having a slope of 3° under the condition that prehardened steel of HRC40 was used as a workpiece, the rotational number was set to 2400 revolutions per minute, the feed per tooth was varied to 0.1, 0.2, 0.3, 0.4 mm/tooth and the tool overhang amount at a pitch of 0.5 mm in the axial direction of the radius end mill was set to 40 mm. After the cutting test, the tool damage state was observed.

As a result of the cutting test, with respect to the example 1, little chattering vibration was observed until the feed per tooth reached 0.4 mm/tooth, that is, the table feed speed reached 2880 mm/min, and stable working could be performed. In addition, no chipping occurred, the tool wear was normal wear and the sufficient cutting work was still possible. On the other hand, with respect to the comparative example, chipping occurred in the outer peripheral edge in the neighborhood of the R edge and chattering vibration was intensified at the feed per tooth of 0.2 mm/tooth, that is, at the table feed speed of 1440 mm/min, and chipping was intensified and the lifetime was expired at the feed per tooth of 0.3 mm/tooth, that is, at the table feed speed of 2160 mm/min.

EXAMPLES 2 TO 5

Radius end mills were manufactured in the same manner as the example 1 except that the margin width of the outer peripheral margin width was set to 0.01 mm (comparative example 2), 0.02 mm (example 2), 0.1 mm (example 3), 0.15 mm (example 4), 0.2 mm (example 5) and 0.25 mm (comparative example 3), and one pocket shape piece of 100 mm in length, 65 mm in width, 35 mm in depth and having a slope of 3° on the side wall thereof was formed by using the continuos line operation using air blow under the condition that the rotational number was set to 1680 revolutions per minute, the feed per tooth was set to 0.625 mm/tooh, the table feed speed was set to 4200 mm/min and the tool overhang length at a pitch of 0.6 mm in the end mill axial direction was set to 40 mm, and the damage state was observed.

As a result of the cutting test, with respect to the examples 1 and 2 to 5, one-shape working could be performed until a depth of 35 mm, and it was still possible to perform cutting. Particularly with respect to the examples 1, 2 and 3, the cut state was stable, the tool damage state after the working was carried out till a depth of 35 mm showed normal wear having a slight wear width, and the machined surface was excellent.

With respect to the examples 4 and 5, the machined surface was not affected, however, the cutting force was large. On the other hand, with respect to the comparative example 2, large chipping occurred in the outer peripheral edge in the neighborhood of the R edge and the machined surface was rough. With respect to the comparative example 3, chattering vibration occurred during cutting, and the machined surface served as a chattering surface. Both the comparative examples 2 and 3 could not be used.

EXAMPLE 6

A radius end mill was manufactured as an example 6 in the same manner as the example 1 so that a margin is also provided to the R edge, and the same cutting test as the examples 2 to 5 was conducted. As a result of the cutting test, the machined surface of the example 6 was not affected, however, it had slight cutting force. The tool damage state until a depth of 35 mm, that is, after one-shape working was finished showed normal wear, however, slight adhesion was observed at the margin portion of the R edge. The wear width was larger than the example 1.

According to this embodiment, the resistance of the outer peripheral edge to chipping and fracture can be enhanced with keeping high machinability of the R edge, and high-efficiency cutting radius end mill which can perform high-feed cutting can be provided.

(Ninth Embodiment)

According to this embodiment, in order to enhance the resistance of the R edge to the fracture and also enhance the discharging performance of chips generated by the R edge to thereby enable the high-feed cutting, when a first cutting edge represents a cutting area of the R edge that is located at the bottom edge side of the radius end mill and a second cutting edge represents a cutting area of the R edge that is located at the outer peripheral edge side of the radius end mill, the rake faces of the first and second cutting edges are curved in a convex shape in a cross-sectional view perpendicular to the end mill axial direction, wherein the second cutting edge has a recessed chip space that extends in the edge bottom direction of the R edge so as to be continuous with the rake face.

In the case of the high-feed cutting where the feed per tooth is extremely increased, the cutting amount in the axial direction of the tool is estimated to correspond to about 30% of the corner R radius at a general site. Accordingly, it is required to provide high mechanical strength and excellent machinability to the first cutting edge. Therefore, according to this embodiment, in order to provide both the high mechanical strength and the excellent machinability, the rake face of the first cutting edge is curved in a convex shape in the cross-sectional view perpendicular to the axial direction of the radius end mill, so that the mechanical strength of the edge tip can be enhanced, chips can be quickly separated from the rake face, the cutting force can be reduced and the machinability can be made excellent. However, in this case, chips are hardly discharged upwardly. In order to avoid this disadvantage, a recessed chip space is provided continuously with the rake face of the second cutting edge so as to extend in the edge bottom direction. Chips generated by the first cutting edge are upwardly discharged through the recessed chip space of the second cutting edge, whereby the bite of the chips can be reduced and chipping and fracture can be suppressed. In a working of a vertical wall surface or the like, the second cutting edge contributes to the cutting in some cases. Therefore, the rake face of the second cutting edge is required to be curved in a convex shape like the first cutting edge to enhance the mechanical strength of the edge tip. The width of the recessed chip space may be gradually reduced. In this case, a site of the second cutting edge which is located in the neighborhood of the first cutting edge and may bite chips generated by the first cutting edge with high probability can be enhanced in mechanical strength. Furthermore, the width of the recessed chip space in the outer peripheral edge direction may be gradually increased, whereby the chips generated by the first cutting edge can be smoothly upwardly discharged.

As described above, in the case of the high-feed cutting where the feed per tooth is extremely increased, the cutting amount in the axial direction of the tool is estimated to correspond to about 30% of the corner R radius at a general site. Therefore, the length in the tool axial direction of the second cutting edge may be set to 20% to 60% of the corner R radius, and the mechanical strength of the first cutting edge having no recessed chip space which is mainly used during the cutting can be surely enhanced. If the length of the second cutting edge in the tool axial direction is less than 20%, the effect of upwardly discharging chips generated by the first cutting edge is reduced. On the other hand, if the length of the second cutting edge is more than 60%, a part of the second cutting edge is also mainly used during the cutting, and also the mechanical strength of the whole body of the R edge is lowered. Therefore, the length in the axial direction of the second cutting edge is preferably set to 30% to 50% of the corner R radius.

In order to attain the mechanical strength of the R edge, the rake angle of the R edge is preferably set to a negative angle, and it is preferably set in the range from 0° to −45°. In consideration of the mechanical strength and the machinability, it is more preferably set in the range from −15° to −30°.

It is advantageous that the number of cutting edges (cutting edge sets) is increased to perform high-efficiency cutting. In the case of a workpiece having a corner portion, when a multi-edge end mill having four or more cutting edges is applied to the workpiece, simultaneously cutting edges exist at the corner portion, so that chattering vibration is liable to occur due to resonance. Therefore, the number of the cutting edges is preferably set to three.

Next, preferable examples according to the ninth embodiment of the present invention will be described hereunder.

EXAMPLE 1

Figure 19:
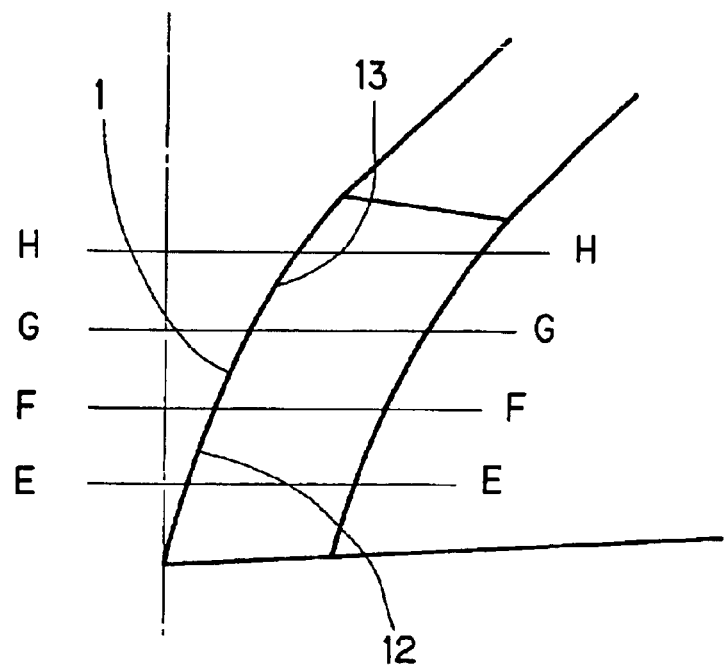
FIG. 19 is an enlarged view showing the end portion of a radius end mill according to a ninth embodiment of the present invention.
Figure 20:
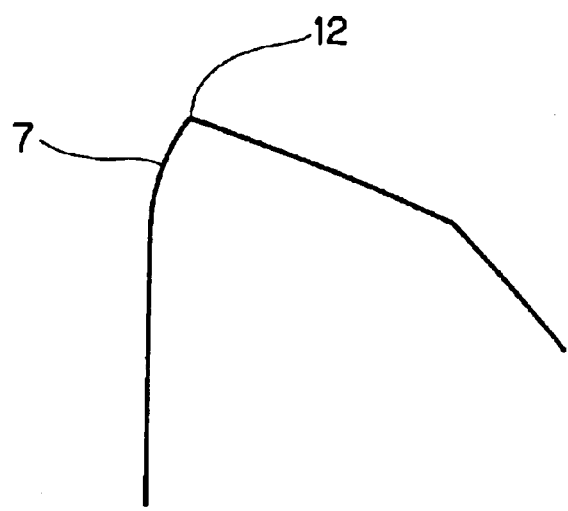
FIG. 20 is a cross-sectional view taken along a line E—E of FIG. 19.
Figure 21:
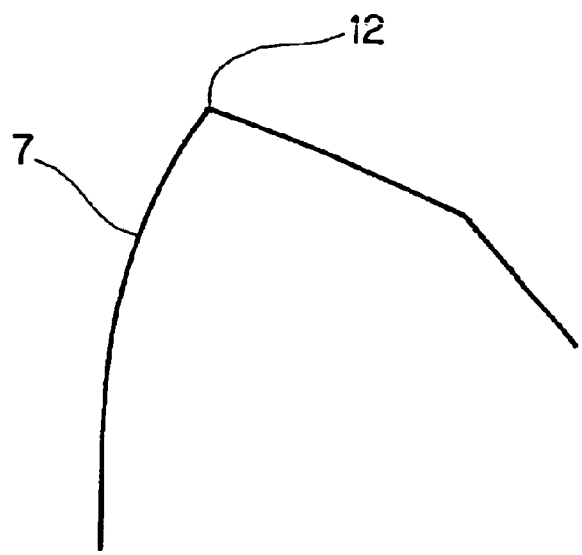
FIG. 21 is a cross-sectional view taken along a line F—F of FIG. 19.
Figure 22:
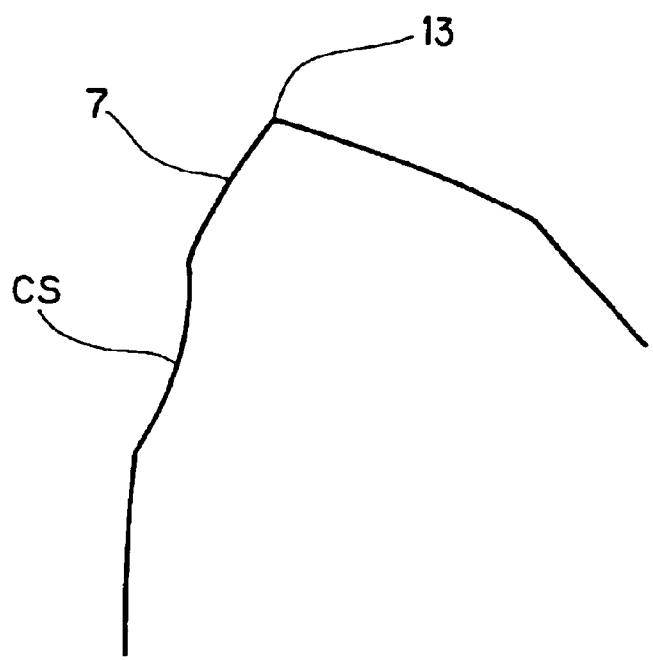
FIG. 22 is a cross-sectional view taken along a line G—G of FIG. 19.
Figure 23:
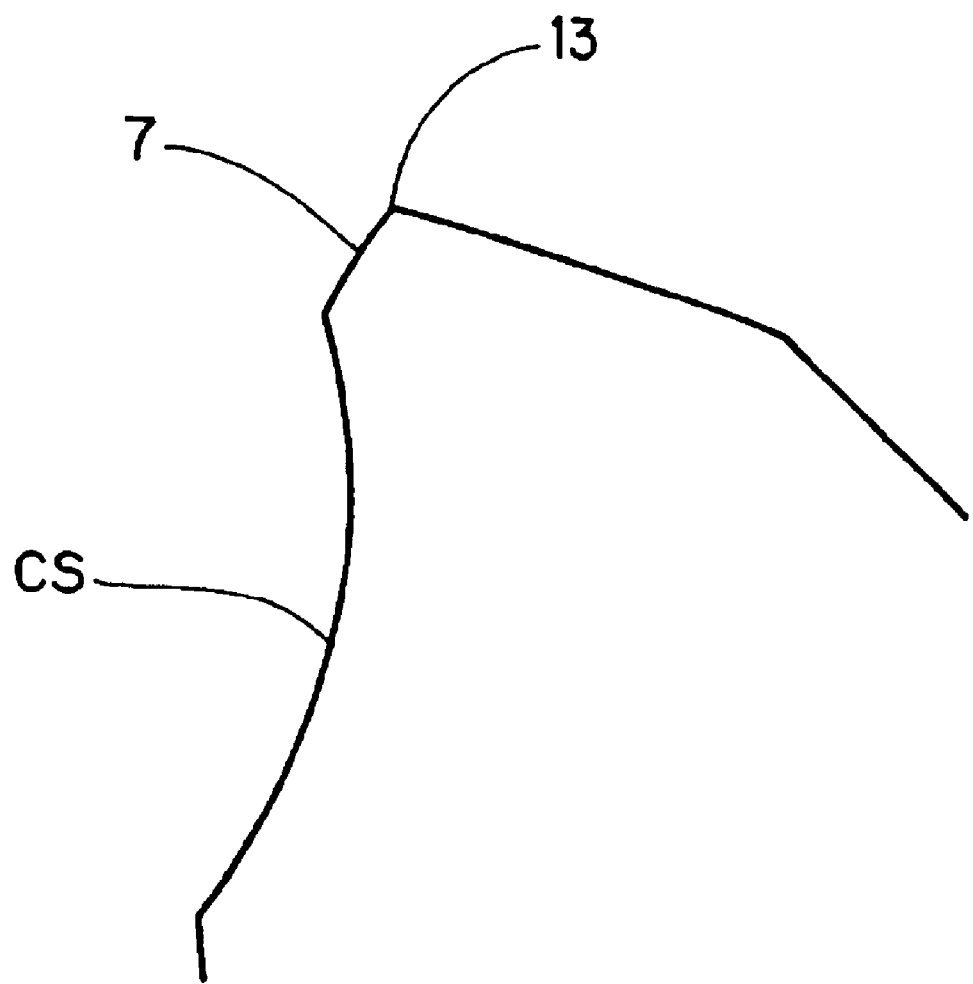
FIG. 23 is a cross-sectional view taken along a line H—H of FIG. 19.

FIG. 19 is an enlarged view showing the end portion of a 3-cutting-edge type of radius end mill of an example 1 formed of ultrafine particle cemented carbide in which the edge diameter is set to 10 mm, the corner R radius is set to 2 mm and the cutting edges are coated with TiAlN. FIGS. 20 to 23 show are cross-sectional views showing the R edge 1 of the example 1 which are taken along a ling E—E, a line F—F, a line G—G and a line H—H of FIG. 19 respectively in a direction perpendicular to the axial direction of the radius end mill from the bottom edge side to the outer peripheral edge side, wherein FIGS. 20 and 21 show a first cutting edge 12 of the R edge 1, and FIGS. 22 and 23 show a second cutting edge 13 of the R edge 1. The rake faces 7 (corresponding to a single rake face common to the first and second cutting edges 12 and 13) of the first and second cutting edges 12 and 13 are designed to be curved in a convex shape, and the second cutting edge 13 has a recessed chip space CP which extends in the edge bottom direction so as to be continuous with the rake face 7. The width of the rake face 7 of the second cutting edge 13 is gradually increased in the direction to the first cutting edge 12, and the width of the recessed chip space CS is gradually reduced. The length in the axial direction of the second cutting edge is set to 40% (0.8 mm) of the corner R radius, and the rake angle of the R edge is set to −25° in the radial direction of the radius end mill.

The cutting test was conducted on the example 1 by applying the contour line operation using air blow to one pocket shape of 100 mm in length, 65 mm in width and 30 mm in depth and having a slope of 3° of the side wall thereof under the condition that prehardened steel of HRC40 was used as a workpiece, the rotational number was set to 1680 revolutions per minute, the feed per tooth was set to 0.625 mm/tooth and the tool overhang length at a pitch of 0.6 mm in the axial direction of the radius end mill was set to 40 mm. After the cutting test, the tool damage state was observed.

For comparison, the radius end mills disclosed in JP-A-7-246508 and JP-A-11-216609 were manufactured as comparative examples 1 and 2 in the same dimension as the example 1, and the same cutting test as the example 1 was conducted.

With respect to the example 1, one-pocket shape could be stably worked with little chattering vibration due to chip biting. No chipping occurred in the R edge, the tool wear was normal wear and the radius end mill was still allowed to carry out the cutting. On the other hand, with respect to the comparative examples 1 and 2, at the initial cutting stage, chipping occurred in the R edge, chattering vibration was intense and chipping was intensified at the time when the 30% of the pocket shape was worked, that is, the depth reached 9 mm, so that the lifetime was expired.

EXAMPLES 2 TO 7

Radius end mills were manufactured in the same manner as the example 1 so that the length in the axial direction of the second cutting edge is set to 10% (example 2), 20% (example 3), 30% (example 4), 50% (example 5), 60% (example 6) and 70% (example 7) of the corner R radius, that is, 0.2 mm (example 2), 0.4 mm (example 3), 0.6 mm (example 4), 1.0 mm (example 5), 1.2 mm (example 6) and 1.4 mm (example 7). The same cutting test and estimation as the example 1 were conducted on these examples 2 to 7 as well as the example 1 in which the length in the axial direction of the second cutting edge is set to 40%, that is, 0.8 mm.

As a result of the cutting test, with respect to the examples 1, 4 and 5, one pocket shape could be stable worked with little chattering vibration due to chip biting, no chipping occurred, the tool wear was normal wear and the radius end mills were still allowed to sufficiently carry out the cutting. With respect to the examples 3 and 6, one pocket shape could be worked, and it was allowed to sufficiently carry out the cutting. However, with respect to the example 2, chattering vibration due to chip biting occurred slightly, and cutting sound was slightly intense. With respect to the example 5, slightly minute chipping was observed in the first cutting edge portion. With respect to the examples 2 and 7, one pocket shape could be worked. However, with respect to the example 2, chattering vibration due to chip biting occurred, the cutting sound was intense and chipping due to chattering vibration occurred. With respect to the example 7, chipping occurred at the boundary portion between the first and second cutting edges, and the lifetime was expired in the examples 2 and 7.

According to this embodiment, the resistance to the fracture of the R edge can be enhanced, and also the discharging performance of chips generated by the R edge can be enhanced, thereby enabling the high-feed cutting.

As described above, according to the present invention, the radius end mill of the present invention is applicable to the three-dimensional curved surface working, the contour line operation, etc., and even when it is used in a working having a cutting amount such as a rough working, the chipping and fracture of the R edge can be suppressed, and the high-efficiency cutting in which the feed per tooth is high can be performed. In addition, in the three-dimensional curved surface working, the contour line operation, etc., the mechanical strength and machinability of the R edge can be enhanced, and the high-feed cutting can be performed with high precision.

Furthermore, according to the present invention, the resistance of the outer peripheral edge to chipping and fracture can be enhanced with keeping high machinability of the R edge, and the high-feed cutting can be performed more stably.

What is claimed is:

1. A radius end mill having a bottom edge formed on the end face thereof, a radius edge designed in a substantially quarter arc shape and formed at a corner portion thereof, and an outer peripheral edge formed spirally on the side surface thereof, the bottom edge and the radius edge being continuously connected to each other at a connecting point A while the radius edge is continuously connected to each other at a connecting point B, and when the intersecting angle between the axial direction of said radius end mill and the normal-line direction at any position of said radius edge is represented by R, the connecting point A corresponding to the R=0° position of said radius edge while the connecting point B corresponds to the R=90° position of said radius edge, characterized in that a view taken along a plane that passes through the connecting points A and B and crosses a rake face of the radius edge is represented by an R cross-sectional view, said rake face of said radius edge is designed to have a convex curved line extending from the connecting point A to the connecting point B in the R cross-sectional view.

2. The radius end mill as claimed in claim 1, wherein when a position on the convex curved line which is farthest away from the line segment AB in the R cross-sectional view is represented by MO, MO is located at a position between the connecting point A and the position which is located on the convex curved line and corresponds to the middle point of the line segment AB.

3. The radius end mill as claimed in claim 1, wherein the curvature of the convex curved line of said rake face of said radius edge in the R cross-sectional view is gradually varied in the direction from the connecting point A to the connecting point B.

4. The radius end mill as claimed in claim 1, wherein the maximum-curvature position of the convex curved line is located at any position on the convex curved line between the connecting point A and the position which is located on the convex curved line and corresponds to the middle point of the line segment AB.

5. The radius end mill as claimed in claim 1, wherein the average curvature of the convex curved line between the connecting point A and the position which is located on the convex curved line and corresponds to the middle point of the line segment AB is set to be larger than the average curvature of the convex curved line between the connecting point B and the position which is located on the convex curved line and corresponds to the middle point of the line segment AB.

6. The radius end mill as claimed in claim 1, wherein a surface constituting a rake face of said radius edge is designed to have a convex curved surface in the direction from the R=90° position to the R=0° position of said radius edge, and a rake face of said bottom edge extending from the R=0° position of said radius edge to the tool rotation axis of said radius end mill is substantially flat.

7. The radius end mill as claimed in claim 6, wherein the rake angle of the rake face of said radius edge is set to a negative angle over the area between the R=90° position and the R=0° position of said radius edge in both the normal-line direction of said radius edge and the radial direction of said radius end mill.

8. The radius end mill as claimed in claim 6, wherein the rake angle in the tool rotation axis direction of a rake face of said bottom edge is set to be smaller than the rake angle of the rake face at the R=0° position of said radius edge.

9. The radius end mill as claimed in claim 6, wherein the rake face of said bottom edge is a gash-worked face.

10. The radius end mill as claimed in claim 1, wherein the edge angle of said radius edge is gradually varied from an acute angle to an obtuse angle and then varied from an obtuse angle to an acute angle in the direction from the bottom edge side to the outer peripheral edge side of said radius end mill, and the edge angle in at least a radius edge site from the R=30° position to the R=60° position of said radius edge is to an obtuse angle.

11. The radius end mill as claimed in claim 10, wherein a shift area from the acute angle to the obtuse angle of the edge angle of said radius edge is set between the R=5° position and the R=30° position of said radius edge, and a shift area from the obtuse angle to the acute angle of the edge angle of said radius edge is set between the R=60° position and the R=85° position of said radius edge.

12. The radius end mill as claimed in claim 11, wherein the maximum value of the obtuse angle is set to 95° or more, and the maximum obtuse angle position of said radius edge is located between the R=30° position and the R=50° position of said radius edge.

13. The radius end mill as claimed in claim 1, wherein the line segment AB passing through the R=0° position and the R=90° position of said radius edge is inclined with respect to a line CL passing the R=0° position of said radius edge and the rotational center of the end of said radius end mill by 10° to 50° in a plan view of the end portion of said radius end mill that is viewed along the axial direction of said radius end mill, and the maximum value of an overhang amount of the edge ridge line of said radius edge which outwardly overhangs from the line segment AB in a convex shape in the sectional view perpendicular to the axial direction of said radius end mill is set to 15% to 30% of the corner R radius.

14. The radius end mill as claimed in claim 13, wherein the position on the edge ridge line at which the overhang amount of the edge ridge line in the convex shape is maximum is located between the R=30° position and the R=50° position of said radius edge.

15. The radius end mill as claimed in claim 1, wherein said radius edge is curved in a convex shape in a corner R45°-direction view of said radius end mill that corresponds to a perspective view of said radius end mill achieved when said radius end mill is viewed along a direction intersecting to the axial direction of said radius end mill at 45° with the connecting point A (R=0° position) of said radius edge set as an anchoring point, and when in the corner R45°-direction view, C represents a projection position on the line segment AB passing through the R=0° position A and the R=90° position B of said radius edge achieved by projecting onto the line segment AB the position corresponding to the maximum overhang amount of the convex-shaped radius edge with respect to the line segment AB, D represents a projection position on the line segment AB achieved by projecting onto the line segment AB a position which corresponds to ¾ of the maximum overhang amount of the convex-shaped radius edge and is nearer to the connecting point A, E represents a projection position on the line segment AB achieved by projecting onto the line segment AB a position which corresponds to ½ of the maximum overhang amount of the convex-shaped radius edge and is nearer to the connecting point A, and F represents a projection position onto the line segment AB achieved by projecting onto the line segment AB a position which corresponds to ¼ of the maximum overhang amount of the convex-shaped radius edge and is nearer to the connecting point A, the length of the line segment CD, DE, EF, FA is varied to be gradually reduced in this order, the variation amount of the length of the line segments is gradually reduced, and the length of the line segment CD is set to 50% or more of the length of the line segment AC.

16. The radius end mill as claimed in claim 15, wherein the length of the line segment AC is set to any value in the range from not less than 40% to less than 50% of the length of the line segment AB.

17. The radius end mill as claimed in claim 15, wherein in the corner R45°-direction view of said radius end mill, the maximum value of the overhang amount of the convex shape of said radius edge is set to a value in the range from 15% to 25% of the corner R radius.

18. The radius end mill as claimed in claim 15, wherein when G represents a projection position on the line segment AB achieved by projecting onto the line segment AB a position which corresponds to ¾ of the maximum overhang amount of the convex-shaped radius edge and is nearer to the connecting point B, H represents a projection position on the line segment AB achieved by projecting onto the line segment AB a position which corresponds to ½ of the maximum overhang amount of the convex-shaped radius edge and is nearer to the connecting point B, and I represents a projection position onto the line segment AB achieved by projecting onto the line segment AB a position which corresponds to ¼ of the maximum overhang amount of the convex-shaped radius edge and is nearer to the connecting point B, the line segments CG, GH, HI, IB on the line segment AB is gradually reduced in length in this order, and the variation amount thereof is also gradually reduced.

19. The radius end mill as claimed in claim 1, wherein the relief angle in the normal-line direction of said radius edge is gradually reduced in the direction from the R=0° position to the R=90° position of said radius edge, and the relief angle in the normal-line direction at the R=0° position of said radius edge is set to 10° or more.

20. The radius end mill as claimed in claim 19, wherein the rake angle in the normal direction at the R=90° position of said radius edge is set to substantially the same rake angle in the normal direction of said outer peripheral edge.

21. The radius end mill as claimed in claim 19, wherein the rake face of said radius edge is designed in a linear or concave curved shape in a cross-sectional view of said radius edge achieved when viewed along the normal-line direction of said radius edge.

22. The Radius end mill as claimed in claim 19, wherein the rake face of said radius edge is designed to have a convex curved surface in the direction from the R=0° position to the R=90° position of said radius edge.

23. The radius end mill as claimed in claim 19, wherein the rake angle of said radius edge is set to a negative angle in both the normal-direction of said radius edge and the radial direction of said radius end mill.

24. The radius end mill as claimed in claim 1, wherein plural radius edges are equipped to the corner portions of the end portion of said radius end mill, each of said radius edges is provided with a margin portion, and the average width of said margin portion is varied every radius edge and/or is varied in each radius edge.

25. The radius end mill as claimed in claim 24, wherein the average width of said margin portion provided to each of said radius edges is set to 0.15 mm or less.

26. The radius end mill as claimed in claim 24, wherein lubricative coating is provided to said margin portion.

27. The radius end mill as claimed in claim 1, wherein said R edge is twisted and continuously connected to said outer peripheral edge spirally-formed on the outer periphery of said radius end mill, the helix angle of said outer peripheral edge is set to 35° to 55°, and a margin having a margin width of 0.02 to 0.2 mm is provided on said radius edge and/or said outer peripheral edge.

28. The radius end mill as claimed in claim 27, wherein said radius edge is a sharp edge.

29. The radius end mill as claimed in claim 1, wherein when a first cutting edge represents a cutting site of said radius edge that is located at the bottom edge side and a second cutting edge represents a cutting site of said radius edge that is located at the outer peripheral edge side, the rake faces of said first and second cutting edges are curved in a convex shape in a cross-sectional view perpendicular to the end mill axial direction, wherein said second cutting edge has a recessed chip space that extends in the edge bottom direction of said radius cutting edge continuously with the rake face of said second cutting edge.

30. The radius end mill as claimed in claim 29, wherein the width of said recessed chip space is gradually reduced.

* * * * *

UNITED STATES PATENT AND TRADEMARK OFFICE
CERTIFICATE OF CORRECTION

PATENT NO. : 6,846,135 B2
DATED : January 25. 2005
INVENTOR(S) : Takahito Kuroda et al.

It is certified that error appears in the above-identified patent and that said Letters Patent is hereby corrected as shown below:

<u>Title page,</u>
Item [75], Inventors, please delete "Ryosuke Okanishi, Moriyama (JP)" and substitute with -- Ryousuke Okanishi Moriyama (JP) --.

Signed and Sealed this

Tenth Day of May, 2005

JON W. DUDAS
*Director of the United States Patent and Trademark Office*